(12) United States Patent
Ray et al.

(10) Patent No.: US 11,866,118 B2
(45) Date of Patent: Jan. 9, 2024

(54) SYSTEMS, DEVICES, AND METHODS FOR DRIVING A WHEEL OF A BICYCLE

(71) Applicant: CLIP.BIKE Inc., Brooklyn, NY (US)

(72) Inventors: Somnath Ray, Brooklyn, NY (US); Michael Circosta, New Hope, PA (US)

(73) Assignee: CLIP.BIKE Inc., Brooklyn, NY (US)

( * ) Notice: Subject to any disclaimer, the term of this patent is extended or adjusted under 35 U.S.C. 154(b) by 749 days.

(21) Appl. No.: 16/829,896

(22) Filed: Mar. 25, 2020

(65) Prior Publication Data

US 2020/0307738 A1 Oct. 1, 2020

Related U.S. Application Data

(60) Provisional application No. 62/906,434, filed on Sep. 26, 2019, provisional application No. 62/826,712, filed on Mar. 29, 2019.

(51) Int. Cl.
*B62K 19/40* (2006.01)
*B62M 6/50* (2010.01)

(52) U.S. Cl.
CPC .............. *B62K 19/40* (2013.01); *B62M 6/50* (2013.01); *B62K 2201/00* (2013.01); *B62K 2204/00* (2013.01)

(58) Field of Classification Search
CPC ........................ B62K 19/40; B62K 2201/00; B62K 2204/00; B62M 6/50; B62M 6/45; B62M 6/75; B62M 13/00; B62J 45/413
See application file for complete search history.

(56) References Cited

U.S. PATENT DOCUMENTS

| | | | |
|---|---|---|---|
| 2,751,991 A | 6/1956 | Mennesson |
| 3,841,428 A | 10/1974 | Bialek |
| 3,912,039 A | 10/1975 | Ordemann |
| 3,978,936 A | 9/1976 | Schwartz |

(Continued)

FOREIGN PATENT DOCUMENTS

| | | |
|---|---|---|
| CN | 203975023 U | 12/2014 |
| DE | 102004020089 A1 | 11/2005 |
| JP | 2004142633 A | 5/2004 |

OTHER PUBLICATIONS

Non-final Office Action issued by the Chinese Patent Office for Chinese Patent No. 202080027040.9, dated Jun. 23, 2022.

(Continued)

*Primary Examiner* — Kevin Hurley
*Assistant Examiner* — Marlon A Arce
(74) *Attorney, Agent, or Firm* — Myers Wolin, LLC

(57) ABSTRACT

A clamping mechanism is provided, the clamping mechanism have two clamps, a tensioning conduit corresponding to each of the clamps, and an actuator for simultaneously tensioning the two clamps by way of the tensioning conduits. Each clamp has a bracing element and a gripping segment, and when the clamps are tensioned along the tensioning conduit, the gripping segment of each clamp is drawn towards the corresponding bracing element. Also provided is a bicycle drive assembly, the assembly has two clamps for fixing to a bicycle, a drive mechanism for driving a bicycle wheel, and two elongate supports extending from the drive mechanism to corresponding clamps. When applied to a bicycle, a wheel of the bicycle passes partially between the elongate supports.

25 Claims, 21 Drawing Sheets

(56) References Cited

U.S. PATENT DOCUMENTS

| | | | |
|---|---|---|---|
| 4,081,048 A * | 3/1978 | Hendricks | B62M 13/02 |
| | | | 180/343 |
| 5,671,821 A | 9/1997 | McGreen | |
| 5,842,535 A * | 12/1998 | Dennis | B62M 13/00 |
| | | | 180/220 |
| 5,910,714 A | 6/1999 | Buchanan et al. | |
| 6,065,557 A | 5/2000 | Von Keyserling | |
| 6,497,299 B1 | 12/2002 | Sinclair et al. | |
| 8,573,346 B2 | 11/2013 | Duignan | |
| 9,073,601 B2 | 7/2015 | Carolin | |
| 9,533,734 B2 | 1/2017 | Olsommer et al. | |
| 9,758,214 B2 | 9/2017 | Guida | |
| 10,005,518 B2 | 6/2018 | Guida | |
| 10,054,141 B2 | 8/2018 | Guida | |
| 10,279,865 B2 | 5/2019 | Guida | |
| 10,526,042 B2 | 1/2020 | Guida | |
| 2004/0065495 A1 | 4/2004 | Huang | |
| 2011/0114407 A1 | 5/2011 | Lee | |
| 2011/0232985 A1 * | 9/2011 | Lee | B62M 6/45 |
| | | | 180/297 |
| 2011/0308872 A1 * | 12/2011 | Bright | B62M 6/75 |
| | | | 180/206.8 |
| 2016/0347408 A1 * | 12/2016 | Guida | B62M 6/75 |
| 2018/0072381 A1 * | 3/2018 | Guida | B62M 6/75 |
| 2021/0031874 A1 | 2/2021 | Yoshizawa et al. | |

OTHER PUBLICATIONS

Spendlove, Tom, "CLIP Turns Any Bike Into an E-Bike", Engineering.com, retrieved from the Internet https//www.engineering.com/DesignerEdge/DesignerEdgeArticles/ArticleID/18831/CLIP-Turns-Any-Bike-Into-an-E-Bike. aspx#disqus_thread, on May 29, 2020, published Mar. 25, 2019.

Tech StartUp, CLIP?Portable e-motor to Transform any bike into an e-bike | Tech StartUp—YouTube, retrieved from the Internet https://www.youtube.com/watch?v=LXDs_IW0TKA on May 29, 2020, published Mar. 24, 2019.

International Search Report and Written Opinion issued by the International Searching Authority for corresponding International Patent Application No. PCT/US/2020/024705, dated May 14, 2020.

The extended European Search Report with written opinion issued by The European Patent Office for European Patent Application No. 20782371.7-1009, dated Nov. 28, 2022.

* cited by examiner

SYSTEMS, DEVICES, AND METHODS FOR DRIVING A WHEEL OF A BICYCLE

CROSS-REFERENCE TO RELATED APPLICATION

This application claims the benefit of U.S. Provisional Patent Application No. 62/906,434 filed Sep. 26, 2019 and also claims the benefit of U.S. Provisional Patent Application No. 62/826,712, filed Mar. 29, 2019, the entirety of each of which is hereby incorporated by reference herein.

FIELD OF THE INVENTION

This disclosure relates to systems and methods for driving a wheel of a bicycle. In particular, the disclosure relates to a friction drive for a bicycle wheel and a clamping mechanism for fixing the friction drive to the bicycle as well as a method for controlling the system for driving the wheel of the bicycle.

BACKGROUND

Bicycling uphill or long distances takes a lot of effort. Similarly, bicyclists may not want to exert so much energy when tired and returning home from work.

Existing solutions for driving a wheel of a bicycle are typically expensive e-bikes, cumbersome kits requiring "do it yourself" installation, or heavy upgrades that are incompatible with shared bikes.

Accordingly, drive assist devices generally require permanent or semi-permanent installation on the frame of conventional bicycles. Friction drive systems usually require mounting an e-motor wired to a battery or alternatively a permanent dock to attach one of several removable parts on the frame of the bicycle. Wheel drive assist systems often replace the entire front or rear wheel of the bike. These installations generate important and permanent transformations of the bicycle which may negatively impact the biking experience, especially for bike commuters, by adding new constraints in terms of convenience, aesthetics, safety, and cost. Further, existing devices typically cannot work with shared bicycles without a compatible interface for fixing the device to the bicycle.

Further, existing solutions may require external sensors to be separately installed in order to determine the current speed of a bicycle. Such a requirement further complicates the installation of a retrofittable bicycle motor and prevents the use of an all in one device.

Further, existing solutions utilizing friction drives to drive a wheel of a bicycle typically require either the weight of the device itself or complicated motorized solutions in order to apply sufficient force to drive the wheel. Some solutions therefore place the drive unit, including battery, circuitry, and the drive mechanism itself directly above the wheel in order to increase the force available. Such a solution requires a heavy drive unit in order to apply sufficient force, and necessarily requires a robust fixation mechanism to be installed.

Other solutions require secondary motors to force the roller of a friction drive against the surface of the wheel. Such approaches result in complicated structures and excessive battery drain.

Further, drive assist devices generally operate with consistent power supply. Providing a consistent supply to the electric motor requires a continuous use of the battery. This type of functioning usually requires large capacity battery packs which increase the weight, the cost and time to recharge the battery while limiting battery life cycle.

As a result, drive assist devices remain marginally used and the launch of different drive assist devices, usually expensive and cumbersome, did not generate a significant increase in the use of bikes, especially for commuting purpose.

There is a need for removing these disadvantages associated with the use of drive assist devices, described above. There is a further need to make the use of drive assist devices more convenient, especially for bike commuters, by maximizing the portability while limiting the cost of the device.

There is a further need for an application associated with a drive assist device that can enable its users to map bike-lane hazards and other bikers in the vicinity and/or alert car drivers of nearby bicyclists.

There is a further need for such a drive assist device that can attach universally to bicycles without requiring a prior installed component. There is a further need for such a device to be fully self-contained, thereby not requiring separate batteries. There is a further need for such a device that does not rely on excessive weight of the drive unit or a complicated secondary motor to generate appropriate force or pressure on the drive wheel of a bicycle, once mounted.

SUMMARY

One embodiment of the device described herein is an all in one, lightweight and compact device, that does not require any previous installation on the frame to be quickly installed on any bike. The device aims to lower the risk of theft by being entirely and instantly removable from the bike when it is parked. The device also runs on pulse signal instead of consistent supply, so it requires lower capacity batteries. The device is composed of easy-to-assemble and economical components, and, in some embodiments, a lower capacity battery pack, to make the device inexpensive and broadly accessible. The device may interface with a mobile app that receives data from an electronic controller as well as other sensors of the phone.

Embodiments of the device generally comprise a friction drive electric motor, activated by pulse signals generated by a battery and regulated by an electronic controller, all of which are contained within a single drive unit or drive assembly.

Such a device is easily attached or detached from different front fork sizes and designs using a clamping jaw mechanism, without requiring any previous installation on any part of the bicycle frame. The device's arm can be manually adjustable to be used with different sizes of bicycle wheels.

The device further contains an electronic controller that transmits to the electric motor fast changes in the amplitude of the supply, alternating short phases of high power and phases of no power in order to optimize use of the battery. The controller may also provide data, via Bluetooth, to a mobile app.

Also described herein is a clamping device for fixing a drive assembly to a fork of a bicycle.

In one embodiment, a clamping mechanism is provided, the clamping mechanism comprising a plurality of clamps, a tensioning conduit corresponding to each of the clamps, and an actuator for simultaneously tensioning the plurality of clamps by way of the tensioning conduits.

Typically, each clamp has a bracing element and a gripping segment, and when the clamps are tensioned along the tensioning conduit, the gripping segment of each clamp is drawn towards the corresponding bracing element.

In some embodiments, the bracing element of each clamp has a substantially arcuate cross section along parallel plans, and the clamps are configured to grip substantially parallel posts. Such bracing elements may be spaced apart at fixed locations relative to each other, and the clamps may then be rigidly located by their respective tensioning conduits or housings for the respective tensioning conduits.

Typically, the clamps are spaced apart with sufficient space between the clamps for a bicycle wheel to pass therebetween.

In some embodiments, the actuator is a lever that manually tensions two tensioning cables within corresponding tensioning conduits simultaneously.

In some embodiments, the tensioning conduits each house a rigid shaft, and the rigid shaft may have a pin extending radially therefrom. The tensioning conduit may then further comprise a path that travels about a circumference of the conduit as it extends axially, such that when the pin travels along the path, the shaft rotates axially. The clamping mechanism may then further comprise a spring opposing tensioning force within each tensioning conduit, such that when tensioning force is applied by the actuator, the rigid shaft is drawn in a first axial direction and rotates from an untensioned position and orientation to a tensioned position and orientation, and wherein when the tensioning force is released, the spring returns the shaft to the untensioned position and orientation.

In some such embodiments, the rigid shaft ends in the gripping segment, and the gripping segment extends radially from the shaft. In the tensioned orientation, the gripping segment passes across the bracing element, and in the untensioned orientation, the gripping segment does not interfere with the bracing element when the bracing elements are applied to supports. Accordingly, when the pin travels along the path, the shaft rotates axially such that the gripping segment is moved from the untensioned orientation to the tensioned orientation.

In some embodiments, each tensioning conduit further comprises a constant force spring mounted on a carriage. The path in each tensioning conduit then has a first segment that travels about the circumference of the conduit and a second segment that is linear, and after the pin reaches the linear segment of the path, additional force from the actuator may be applied to the carriage against the resistance of the constant force spring.

In such an embodiment, upon tensioning the clamps along the tensioning conduit, the gripping segment of each clamp is rotated by the corresponding path in a first segment of travel and is then drawn towards the corresponding bracing element during a second segment of travel. After clamping onto an object to be clamped, any additional force from the actuator is then applied to the carriage.

In some embodiments, the tensioning conduit comprises a constant force spring, and when the gripping segment of each clamp is drawn towards the corresponding bracing element, a final segment of tensioning for the gripping segment is against the force of the constant force spring. In such an embodiment, the constant force spring may be mounted on a carriage, and during a first segment of travel, the gripping segment moves towards the bracing element, and during a final segment of travel, the gripping segment is stationary relative to the bracing element and the carriage moves relative to the gripping segment.

In some embodiments, a bicycle drive assembly is provided, the assembly comprising at least one clamp for fixing to a bicycle, a drive mechanism for driving a bicycle wheel, and a plurality of elongate supports extending from the drive mechanism to the at least one clamp. When applied to a bicycle, a wheel of the bicycle passes partially between the elongate supports.

Typically the at least one clamp is a plurality of clamps for independently engaging two legs of a bicycle fork on opposite sides of the wheel of the bicycle. In such an embodiment, each clamp corresponds to one of the elongate supports, and each elongate support contains a tensioning mechanism for tensioning the corresponding clamp.

In some embodiments, a clamp actuator is provided adjacent the drive mechanism for actuating the plurality of clamps by way of the tensioning mechanisms in the corresponding elongate supports.

The drive mechanism may be a friction drive comprising a roller applied to a radially outer surface of the bicycle wheel. The roller may have a stone outer layer. In some embodiments, the roller may have a convex profile for maintaining an outer surface of the bicycle wheel at a center of the profile during use.

In some embodiments, the friction drive comprises a roller applied to a radially outer surface of the bicycle wheel, and the at least one clamp is rigidly fixed to the bicycle, such that the plurality of elongate supports generate a force directed towards the clamp, thereby providing an application force from the roller to the outer surface of the bicycle wheel greater than a weight of the bicycle drive assembly.

In some embodiments, the elongate supports comprise housings, and batteries and electronic control systems are contained within the housings. The bicycle drive assembly may further comprise a motor in the drive assembly, and an electronic controller for the motor, and the motor may include a Hall Effect sensor for controlling the motor.

In some embodiments, a method is provided for driving a bicycle wheel using a bicycle drive assembly, such as those discussed above, the method comprising providing a drive motor driving a friction roller, monitoring a speed of the motor to determine a speed of a driven wheel of a bicycle, and determining if the speed of the driven wheel is above a throttle enabling threshold.

The method then receives an indication from a user that assist should be applied to the driven wheel of the bicycle. Upon receipt of such an indication, a driving force is applied to the driven wheel of the bicycle only while the user provides an ongoing indication and the speed of the driven wheel is above the throttle enabling threshold.

In some embodiments, the driving force applied to the driven wheel is a constant force applied relative to the current speed of the motor. In some embodiments, the motor charges from the rotation of the driven wheel applied to the friction roller when driving force is not being applied to the driven wheel of the bicycle.

In some embodiments, the method further comprises providing an indication device for receiving indications from the user, wherein the indication device is linked to a controller for controlling the motor by a wireless connection.

DETAILED DESCRIPTION OF THE PREFERRED EMBODIMENTS

Figure 1:
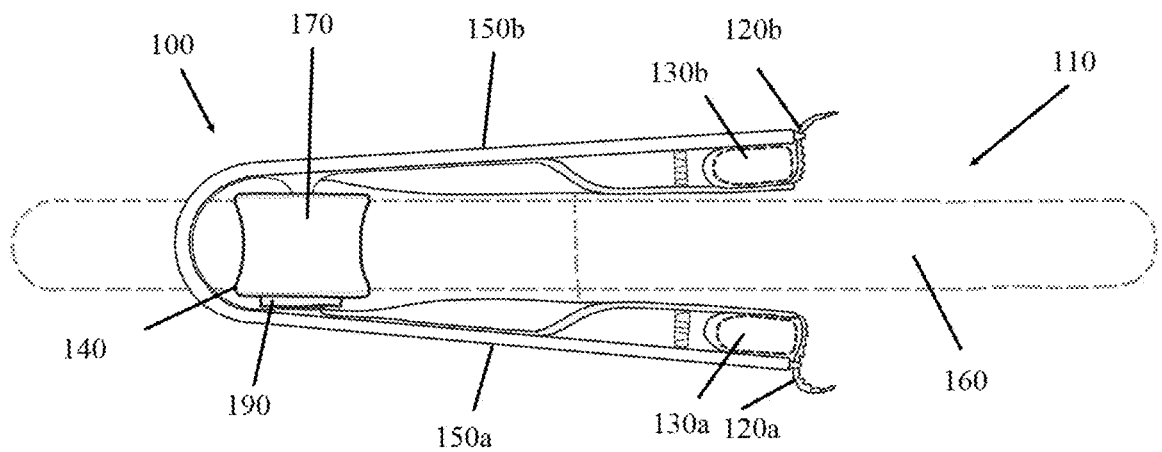
FIG. 1 provides a top view of one embodiment of a bicycle drive assembly in the context of a bicycle.

The description of illustrative embodiments according to principles of several illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits are illustrated by reference to certain exemplified embodiments and may not apply to all embodiments. Accordingly, the invention expressly should not be limited to such exemplary embodiments illustrating some possible non-limiting combination of features that may exist alone or in other combinations of features; the scope of the claimed invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The various embodiments described herein provide a bicycle drive assembly for driving a wheel of a bicycle as well as a clamping mechanism for fixing a bicycle drive assembly to a bicycle so that the drive assembly can drive a wheel. Also discussed herein is a method for driving the wheel of a bicycle by way of a bicycle drive assembly.

Figure 2:
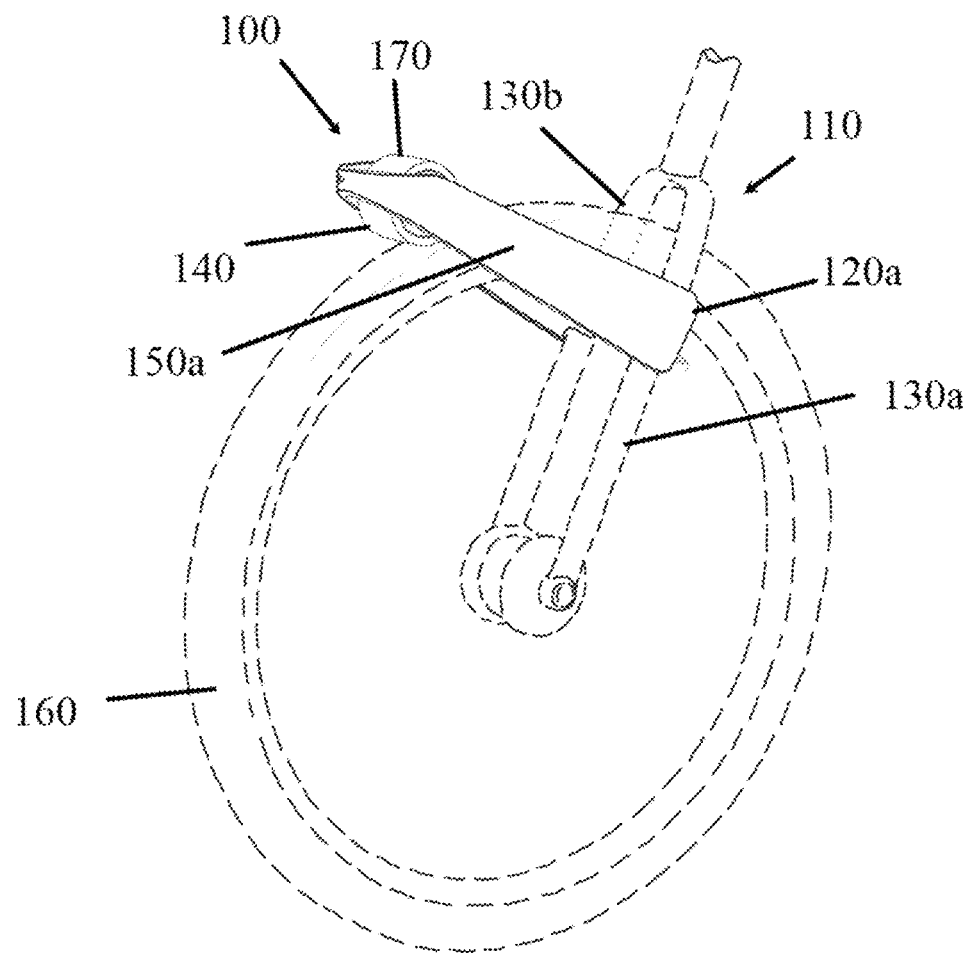
FIG. 2 provides a front perspective view of the bicycle drive assembly of FIG. 1.
Figure 3:
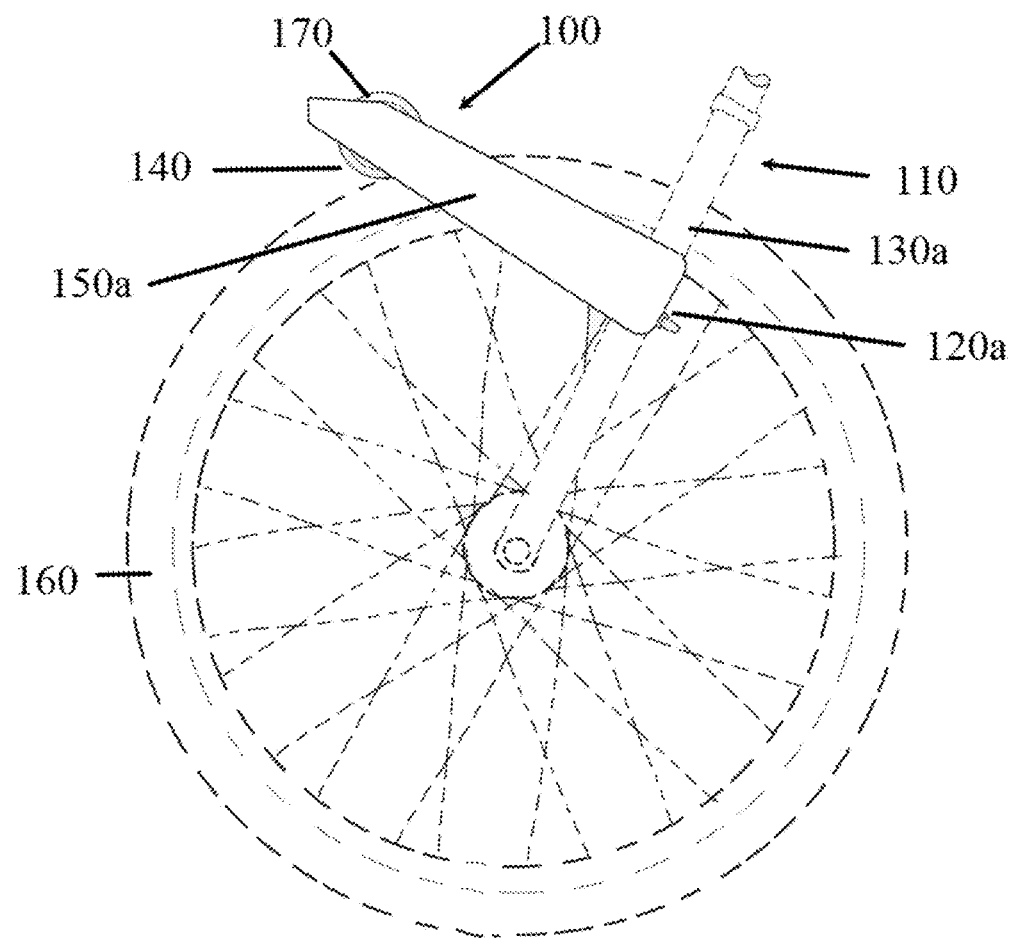
FIG. 3 provides a side view of the bicycle drive assembly of FIG. 1.

FIG. 1 provides a top view of one embodiment of a bicycle drive assembly 100 in the context of a bicycle 110. FIG. 2 provides a front perspective view and FIG. 3 provides a side view of the bicycle drive assembly 100 of FIG. 1.

As shown, the bicycle drive assembly 100 comprises at least one clamp or clamping mechanism 120a, b for fixing the drive assembly to the bicycle 110. In the embodiment shown, two clamping mechanisms 120a, b are provided for clamping the drive assembly 100 to two legs 130a, b of the front fork of the bicycle 110.

The bicycle drive assembly 100 further comprises a drive mechanism 140 for driving the bicycle wheel and a plurality of elongate supports 150a, b extending from the drive mechanism 140 to the clamps 120a, b. When the drive assembly 100 is mounted to the bicycle 110 using the clamps 120a b, a wheel 160 of the bicycle passes at least partially between the elongate supports 150a, b.

Similarly, where two clamps 120a, b are provided for fixing the drive assembly 100 to the bicycle 110, one clamp is provided to mate with each of the two legs 130a, b of the front fork of the bicycle on opposite sides of the wheel 160.

Typically, each clamp 120a, b corresponds to one of the elongate supports 150a, b, such that each elongate support ends at its respective clamp. The elongate support 150a, b may further provide a mechanism, or a portion of a mechanism, for actuating the corresponding clamp 120a, b. Such mechanisms are discussed in more detail with respect to the second and third embodiments of the bicycle drive assemblies 400, 700 shown in FIGS. 4-11 and 14-20B.

As shown, the drive mechanism 140 is a friction drive comprising a roller 170 applied to a radially outer surface of the bicycle wheel 160. The roller 170 may comprise a wide variety of materials, and in some embodiments, may comprise a rubber or rubberized core and a stone outer layer. In some embodiments, the roller 170 may be interchangeable such that a user may select an appropriate roller for weather or surface conditions or for a particular bicycle wheel. Further, as in the embodiment shown, the bicycle wheel 160 is located at least partially between the roller 170 of the drive mechanism 140 and the fixation point of the clamps 120a, b on the legs 130a, b of the fork of the bicycle. Accordingly, the elongate supports 150a, b on either side of the bicycle wheel 160 are sized to generate a force directed towards the clamps 120a, b, and thereby provide pressure between the roller 170 and the outer surface of the bicycle wheel 160. In this way, the drive assembly 100 may apply a force from the roller 170 to the outer surface of the bicycle wheel 160 greater than a weight of the bicycle drive assembly.

The drive mechanism 140 may further include an electronic motor 190 to drive the roller 170. This may be embedded in the roller itself 170, as shown, or it may be provided externally to the roller. When supplied with power, the motor 190 activates the rotation of the roller 170 which engages the rotation of the front wheel 160 by friction between the roller surface and a tire surface of the wheel. Different motor speeds can be set to accelerate the rotation of the roller 170 and to thereby accelerate the rotation of the front wheel 160. When the motor 190 is not activated, the roller spins freely with the tire, with minimum friction in the motor itself. The motor 190 may be equipped with a rotation sensor, such as a Hall Effect sensor, that constantly monitors the speed of the wheel 160, in order to adjust the speed of the roller 170 as appropriate.

In some embodiments, when the motor 190 is not engaged, it may apply some friction internally so as to function as a generator, thereby providing some power to batteries within the drive assembly 100.

As shown, the elongate supports 150a, b, or a portion of the elongate supports, may provide housings 180a, b for various components of the drive assembly 100. These components may include, for example, an electronic control system including a controller, and batteries. As discussed below in reference to FIGS. 4-10, the elongate supports 140 may further comprise tensioning mechanisms for actuating the clamps 120a, b.

Figure 4:
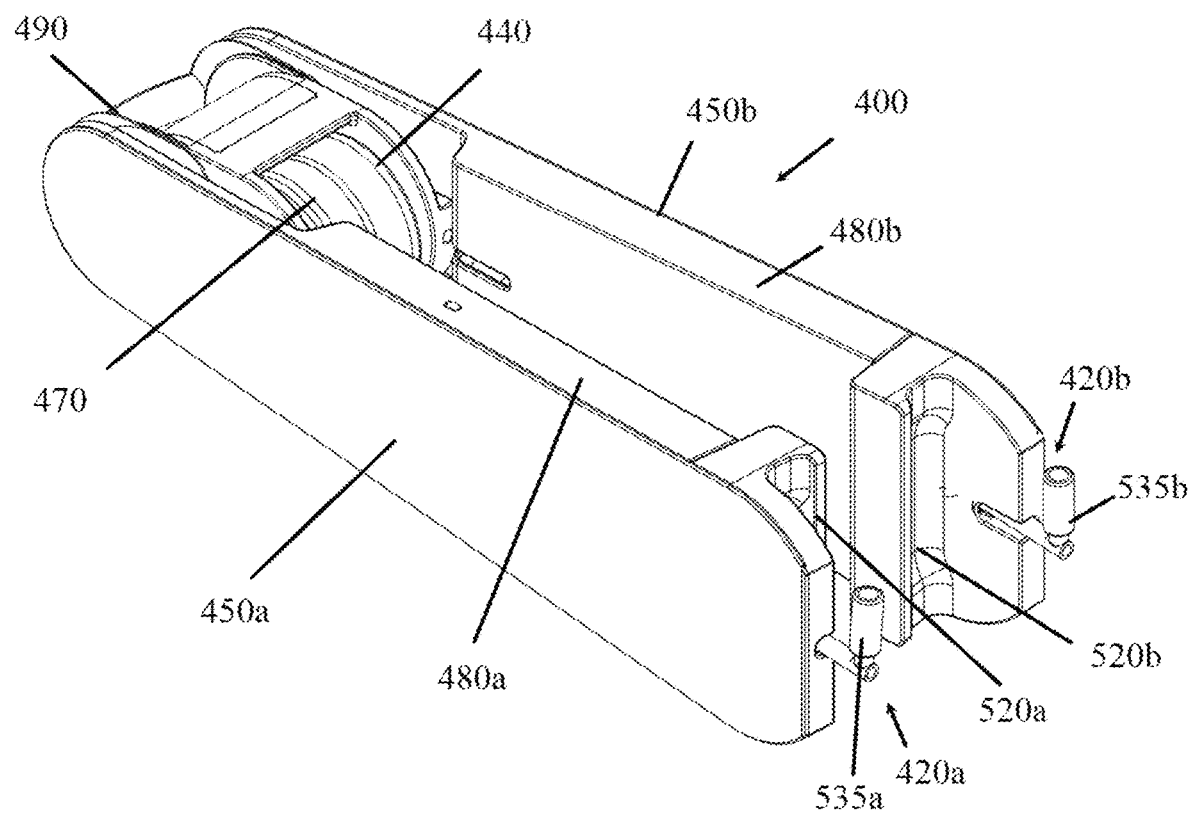
FIG. 4 provides a perspective view of a second embodiment of a bicycle drive assembly in a first configuration.
Figure 5:
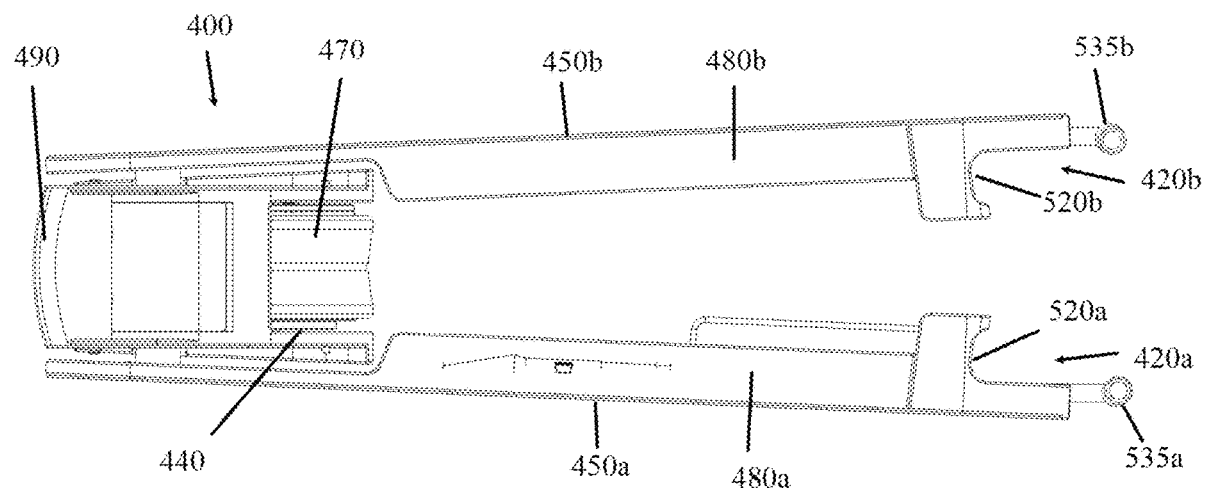
FIG. 5 provides a top view of the bicycle drive assembly of FIG. 4 in the first configuration.
Figure 6:
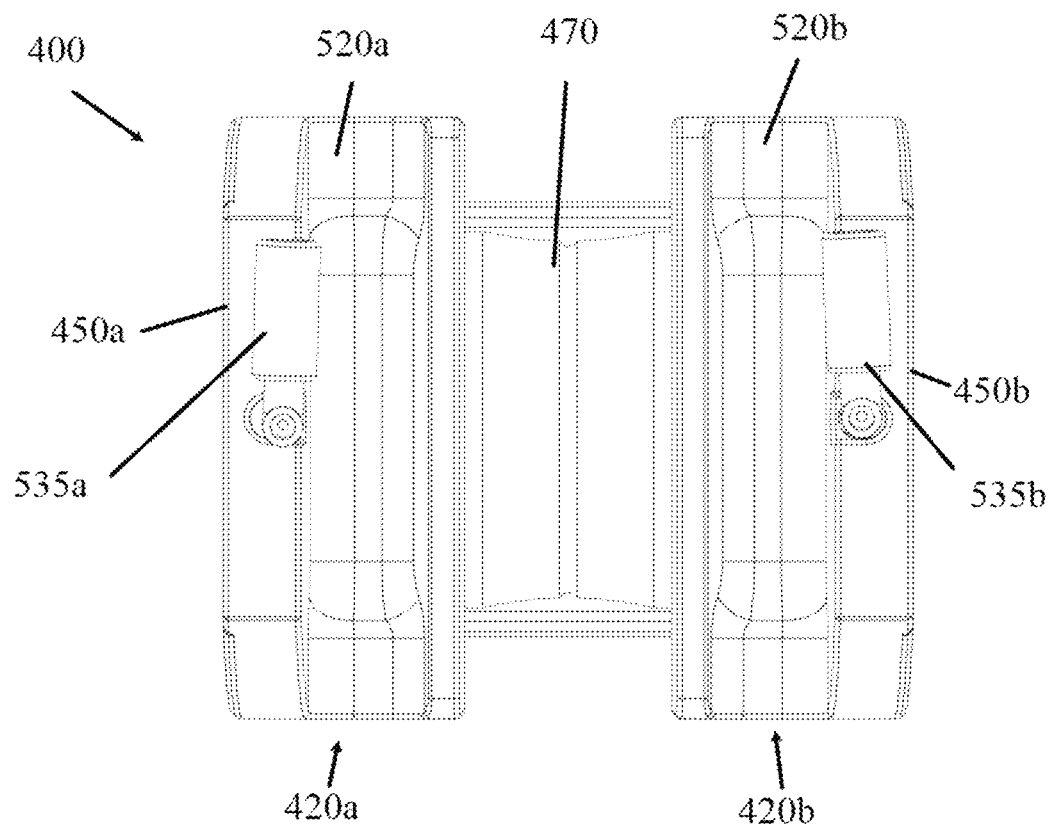
FIG. 6 provides a back view of the bicycle drive assembly of FIG. 4 in the first configuration.

FIG. 4 provides a perspective view of a second embodiment of a bicycle drive assembly 400 in a first configuration. FIG. 5 provides a top view and FIG. 6 provides a back view of the bicycle drive assembly 400 of FIG. 4 in the first configuration.

Figure 7:
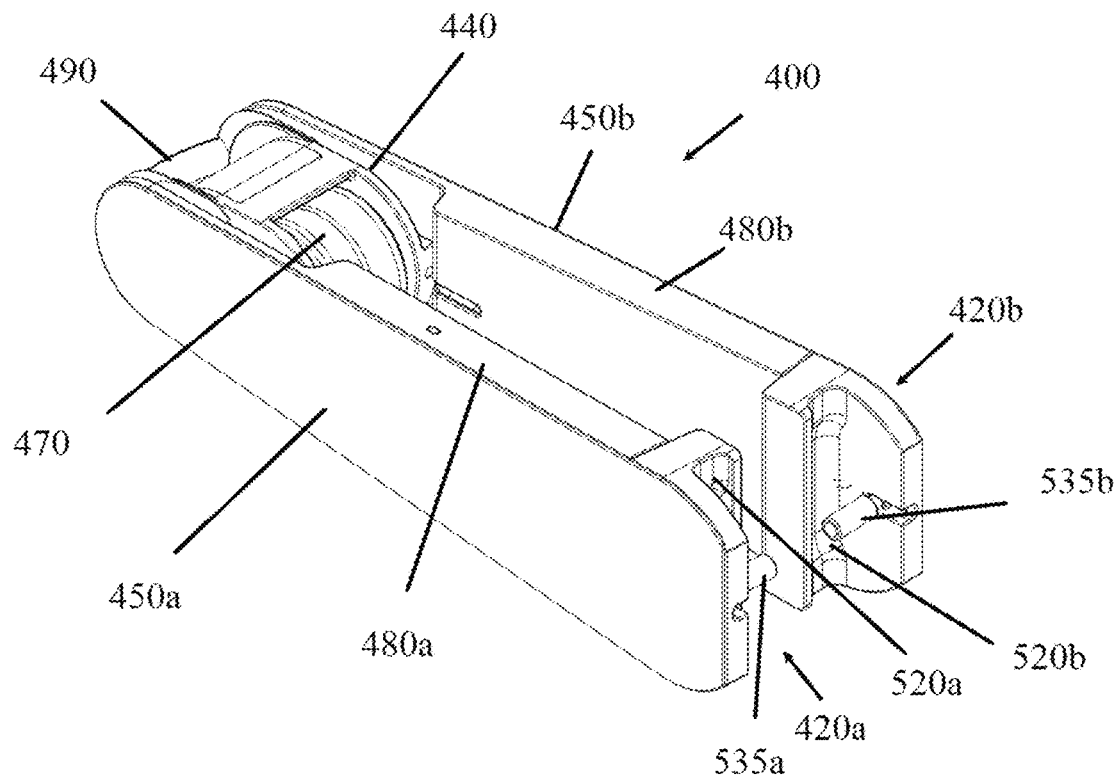
FIG. 7 provides a perspective view of the bicycle drive assembly of FIG. 4 in a second configuration.
Figure 8:
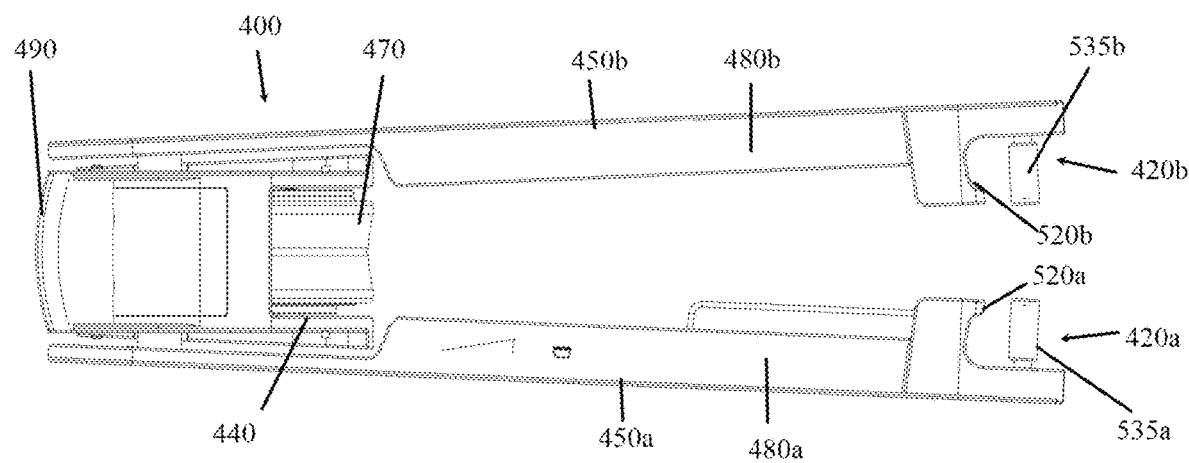
FIG. 8 provides a top view of the bicycle drive assembly of FIG. 4 in the second configuration.
Figure 9:
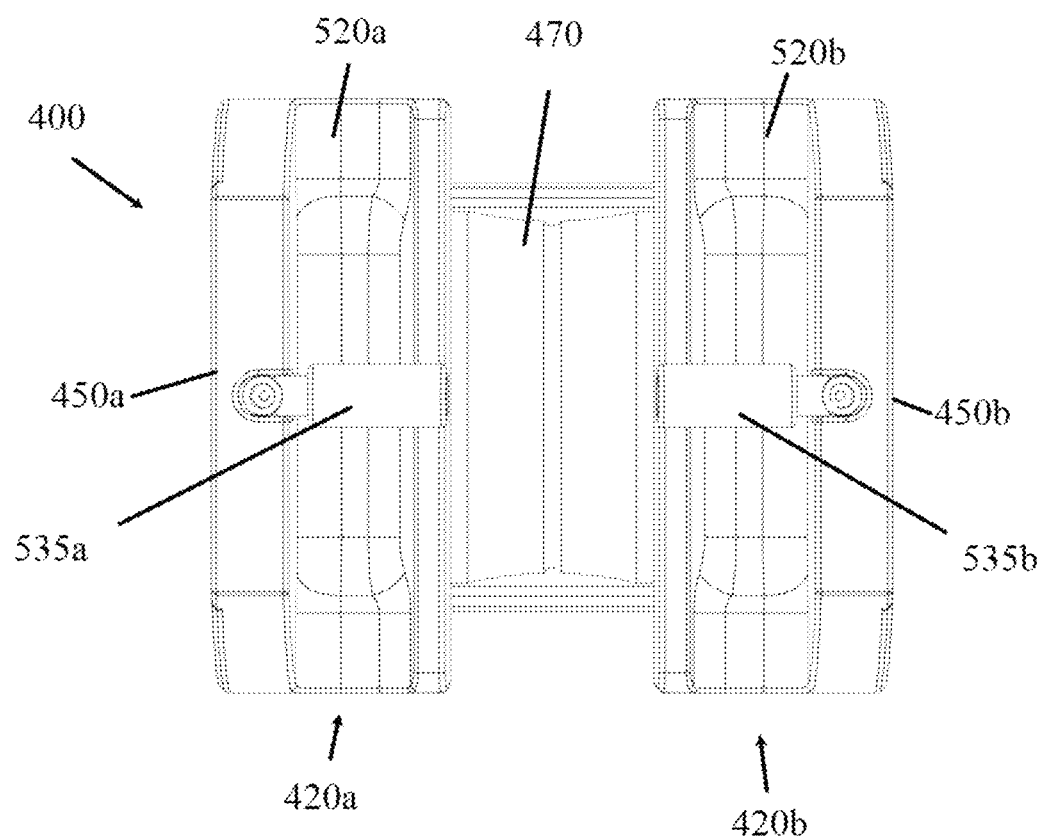
FIG. 9 provides a back view of the bicycle drive assembly of FIG. 4 in the second configuration.

FIG. 7 provides a perspective view of the bicycle drive assembly 400 of FIG. 4 in a second configuration. FIG. 8 provides a top view and FIG. 9 provides a back view of the bicycle drive assembly 400 of FIG. 4 in the second configuration.

Figure 10:
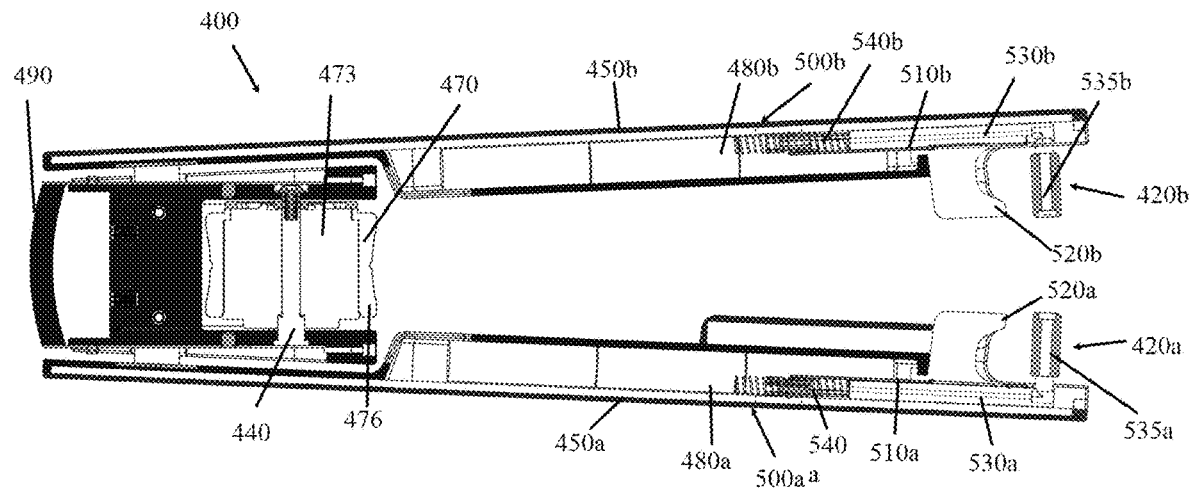
FIG. 10 provides a top sectioned view of the bicycle drive assembly of FIG. 4 in the second configuration.
Figure 11:
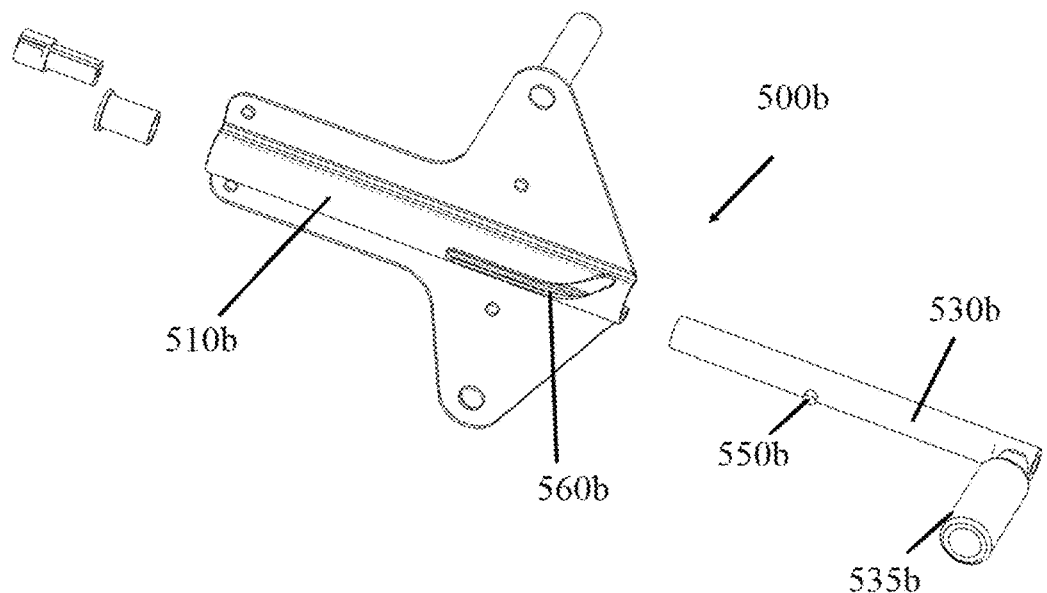
FIG. 11 provides an exploded view of several components of the bicycle drive assembly of FIG. 4.

FIG. 10 provides a top sectioned view of the bicycle drive assembly 400 of FIG. 4 in the second configuration and FIG. 11 provides an exploded view of several components of the bicycle drive assembly of FIG. 4.

As shown, the bicycle drive assembly 400 comprises at least one, and typically two, clamps or clamping mechanisms 420a, b for fixing the drive assembly to a bicycle. In the embodiment shown, two clamping mechanisms 420a, b are provided for clamping the drive assembly 400 to two legs of the front fork of the bicycle.

The bicycle drive assembly 400 further comprises a drive mechanism 440 for driving the bicycle wheel and a plurality of elongate supports 450a, b extending from the drive mechanism 440 to the clamps 420a, b. When the drive assembly 400 is mounted to the bicycle using the clamps 420a, b, a wheel of the bicycle passes at least partially between the elongate supports 450a, b.

Similarly, where two clamps 420a, b are provided for fixing the drive assembly 400 to the bicycle, one clamp is provided to mate with each of the two legs of the front fork of the bicycle on opposite sides of the wheel, as discussed above with respect to the embodiment of FIG. 1.

Typically, each clamp 420a, b corresponds to one of the elongate supports 450a, b, such that each elongate support ends at its respective clamp. The elongate support 450a, b may further provide a mechanism, or a portion of a mechanism, for actuating the corresponding clamp 420a, b. As visible in the sectioned view of FIG. 10, for example, each elongate support 450a, b may contain a tensioning mechanism 500a, b for tensioning the corresponding clamp 420a, b. The tensioning mechanism is described in more detail below.

As shown, the drive mechanism 440 is a friction drive comprising a roller 470 applied to a radially outer surface of the bicycle wheel. The roller 470 may comprise a wide variety of materials, and in some embodiments, may comprise a rubber or rubberized core 473 and a stone outer layer 476. Such a stone outer layer 476 may provide increased friction between the roller and a surface of a tire mounted on the bicycle. Further, in some embodiments, a profile of the outer surface of the roller 470 may be shaped and provided with an arcuate form or a flared form to better cup the outer surface of the bicycle wheel or tire. Similarly, the profile of the roller 470 may be provided with a groove or V shape, such that the bicycle wheel remains centered along the surface of the roller. Alternatively, as shown below in reference to the third embodiment of FIG. 14, the roller surface may have a convex profile shape, such that the curvature of the roller surface and the curvature of the bicycle wheel combine to automatically center the roller of the corresponding drive mechanism.

Further the bicycle wheel is located at least partially between the roller 470 of the drive mechanism 440 and the fixation point of the clamps 420a, b on the fork of the bicycle. Accordingly, the elongate supports 450a, b on either side of the bicycle wheel are sized to generate a force directed towards the clamps 420a, b, and thereby provide pressure between the roller 470 and the outer surface of the bicycle wheel. In this way, the drive assembly 400 may apply a force from the roller 470 to the outer surface of the bicycle wheel greater than a weight of the bicycle drive assembly.

The drive mechanism 440 may further include an electronic motor to drive the roller 470. This may be embedded in the roller itself 470 or it may be provided externally to the roller. When supplied with power, the motor activates the rotation of the roller 470 which engages the rotation of the front wheel by friction between the roller surface and a tire surface of the wheel. Different motor speeds can be set to accelerate the rotation of the roller 470 and so accelerate the rotation of the front wheel. When the motor is not activated, the roller 470 spins freely with the tire, with minimum friction in the motor itself. The motor may be equipped with a rotation sensor, such as a Hall Effect sensor, that constantly monitors the speed of the wheel, in order to adjust the speed of the roller 470 as appropriate.

In some embodiments, when the motor is not engaged, it may apply some friction internally so as to function as a generator, thereby providing some power to batteries within the drive assembly 400.

As shown, the elongate supports 450a, b, or a portion of the elongate supports, may provide housings 480a, b for various components of the drive assembly 400. These components may include, for example, an electronic control system including a controller, and batteries. Further, the elongate supports 450a, b may further comprise tensioning mechanisms for actuating the clamps 420a, b. In such an embodiment, the drive assembly 400 may further comprise a clamp actuator 490 adjacent the drive mechanism 440 for actuating the clamps 420a, b by way of the tensioning mechanisms 500a, b in the corresponding elongate supports 450a, b.

Accordingly, a clamping mechanism for the bicycle drive assembly 400 generally comprises the two clamps 420a, b discussed above, a tensioning mechanism 500a, b corresponding to each clamp, and a clamp actuator 490 for simultaneously tensioning both clamps by way of the tensioning mechanism.

Each tensioning mechanism 500a, b typically comprises a tensioning conduit 510a, b which provides a path along which tension can be loaded. Each clamp 420a, b is then provided with a bracing element 520a, b and a gripping segment 535a, b, and when the clamps are tensioned along their tensioning conduits, the gripping segment of each clamp is drawn towards the corresponding bracing element.

The bracing element 520a, b of each clamp 420a, b may be provided with a surface contour or a surface profile ideal for gripping a component of a bicycle, such as the parallel posts that make up the legs of a front fork. Accordingly, each bracing element 520a, b may have a substantially arcuate or otherwise rounded cross section that may run along parallel axes, such that it can grip the parallel posts, such as those shown in FIGS. 1-3 with respect to the first embodiment of the bicycle drive assembly 100.

In order to locate the clamps 420a, b so that they can grip the bicycle fork, the clamps are spaced apart at fixed locations relative to each other. Accordingly, the clamps 420a, b may be rigidly located by their respective tensioning conduits 510a, b or the housings 420a, b containing the conduits, which may be the elongate supports 450a b themselves, or which may be part of the elongate supports. Typically, when the clamps 420a, b are spaced apart from each other, sufficient space is provided between the clamps for a bicycle wheel to pass therebetween.

In some embodiments, the space between the clamps 420a, b may be adjustable, such that the drive assembly 400 can be applied to bicycles having different fork designs and different size wheels. In some such embodiments, the elongate supports 450a, b may be hinged relative to each other such that they can be horizontally adjustable.

The clamp actuator 490 may be a lever that manually tensions two tensioning cables or other tensioning mechanisms 500a, b simultaneously. The functioning of the actuator 490 and the tensioning mechanisms 500a, b is described in reference to FIGS. 10 and 11. The mechanisms 500a, b are partially illustrated, with the tensioning cables themselves not shown. It is further noted that while the clamp actuator 490 is shown in the same position throughout the figures, it will be understood that in the first configuration, with the clamps 420a, b shown as they are in FIGS. 4-7, the clamp actuator 490 would typically be in a raised position at close to a right angle relative to the elongate supports 450a, b, and in the second configuration, with the clamps shown as they are in FIGS. 8-10, the clamp actuator would typically be provided as shown.

As shown, the tensioning conduits 510a, b house rigid shafts 530a, b. The rigid shafts 530a, b are typically linked to the clamp actuator 490 by way of a tensioning cable (not shown). The tensioning cable typically draws the rigid shafts towards the actuator 490. The tensioning mechanisms 500a, b further comprise springs 540a, b opposing the tensioning force, and thereby pushing the rigid shafts 530a, b away from the actuator 490 and in the direction of the clamps 420a, b. The rigid shafts 530a, b typically further comprise the gripping segments 535a, b which extend radially at an end of the shaft adjacent the corresponding clamp 420a, b.

As shown, each of the rigid shafts 530a, b comprise a pin 550a, b extending radially therefrom. The tensioning conduits 510a, b each comprise a path 560a, b along which the corresponding pins 550a, b travel. The paths 560a, b each extend axially along the corresponding tensioning conduit 510a, b and travels about a circumference of the conduit as it extends axially. Accordingly, when the corresponding pin 550a, b travels along the path 560a, b, the corresponding rigid shaft 530a, b rotates axially.

In this way, the clamps 420a, b transition from a first, untensioned configuration, shown in FIGS. 4-6 to a second, tensioned configuration shown in FIGS. 7-10. In the first configuration, no tension is provided by the actuator 490, and therefore no tensioning force opposes the spring force provided by the springs 540a, b. As such, the rigid shafts 530a, b are fully extended, and the pins 550a, b are at the first ends of their respective paths 560a, b.

Further, in the first configuration, the gripping segments 535a, b of the clamp are rotated with the corresponding rigid shafts 530a, b so that they do not interfere with the corresponding bracing elements 520a, b. As shown, the gripping segments 535a, b may extend from the corresponding rigid shafts 530a, b in a direction parallel the axis of the bracing segment 520a, b, such that the clamps can be applied directly to corresponding parallel posts, such as the legs of a bicycle fork without the gripping segments interfering.

In transitioning from the first configuration to the second configuration, the actuator 490 is used to apply a tensioning force to the tensioning mechanisms 500a, b in opposition to the spring force from the springs 540a, b. Accordingly, the rigid shafts 530a, b move along the corresponding tensioning conduits 510a, b and the pins 550a, b move along the corresponding paths 560a, b. As such, the rigid shafts 530a, b move towards the actuator 490 and rotate, such that the gripping segments 535a, b extend radially from the rigid shafts 530a, b across the corresponding bracing segments 520a, b and apply the tensioning force as a clamping force to any object braced against the bracing segments.

Accordingly, upon application of force from the actuator 490, the clamping mechanisms 420a, b transitions from the first configuration shown in FIGS. 4-7 in which the rigid shaft 530a, b is untensioned and the gripping segments 535a, b do not interfere with the bracing elements 520a, b to a second configuration, shown in FIGS. 8-10. In the second configuration, the rigid shafts 530a, b are tensioned and drawn towards the actuator 490 and are thereby rotated, such that the gripping segments 535a, b extend across the bracing elements 520a, b and apply a clamping force.

In both the embodiment shown in FIGS. 1-3 and that shown in FIGS. 4-10, the bicycle drive assembly and the clamping mechanism form an all in one, lightweight and compact device that does not require any previous installation on a bicycle frame to be quickly installed on a wide variety of bicycles. In some embodiments, the length of the elongated supports are adjustable once the clamping mechanism is applied in order to adjust the amount of force applied by the drive mechanism to a tire of a bicycle wheel.

In some embodiments, instead of directly adjusting the length of the elongated supports, the effective length may be adjusted by locating the clamping mechanisms higher or lower on the fork of the bicycle. In this way, the roller may be located higher or lower on the front wheel, such that the contact patch between the roller and the front wheel is at an appropriate distance from the fork. The elongated supports may be made of aluminum or similar materials in order to limit weight and ease heat dissipation.

As shown, the roller 470 may have a curved surface, which allows it to adapt to different tire sizes and designs while optimizing the contact between roller and tire. Alternatively, as discussed below in reference to FIGS. 14-20, the roller 770 may have a convex profile shape, such that the interaction between the curved surface of the wheel and the curved surface of the roller force the roller to automatically recenter. In any event, the roller 170, 470, 770 may be made of rubber or similar material covered by a stone layer to increase grip on the tire and reduce slippage.

In some embodiments, the clamps 120a, b, 420a, b and/or the elongated supports 150a, b, 450a, b are provided with adjustments that allow for varying between fork size and space between forks. Further, such adjustments may be provided to adjust for different wheel sizes or tire sizes.

A Li-ion battery capable of powering the electric motor may be wired to the motor pack via the electronic controller system. When activated, and on demand of the electronic controller, the battery powers the electric motor. The battery can be recharged from a common AC power supply. Battery, motor and electronic controller unit are mounted close together on a single support, and therefore only a short connector is required to connect them together. While a Li-ion battery is mentioned, other battery chemistries are contemplated as well.

Figure 12:
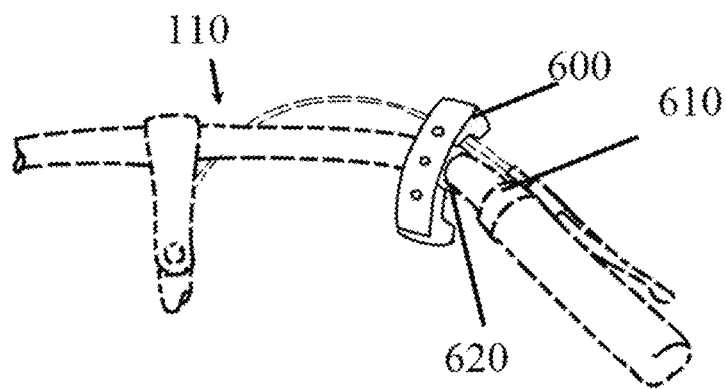
FIG. 12 provides a view of a controller for use with a bicycle drive assembly.

FIG. 12 provides a view of a remote control 600 for use with a bicycle drive assembly 100, 400. As shown, the remote control 600 can be clipped on to a handlebar 610 of a bicycle using a flexible-plastic, open ring 620 or similar basic clipping system. A rider of a bicycle can then activate the electric motor using the remote control 600. The remote control 600 may be linked to the controller using, for example, Bluetooth. The controller can then deliver current to the electric motor according to the methods discussed elsewhere herein. The remote control 600 may be chargeable directly by USB or may be charged from the bicycle drive assembly 100 when connected thereto.

In some embodiments, once the throttle remote control 600 is clipped on the handlebar 610, or another part of the frame of the bicycle, a magnetic connection allows to automatically turn on the device 100. Once the throttle remote control 600 is unclipped from the handlebar 610 or another part of the frame and the magnetic connection is stopped, the device 100 is automatically turned off. The rider can activate the electric motor 190, using the external throttle unit or other similar sensor, connected via bluetooth to the electronic controller. The controller delivers the power to the electric motor though pulse signal, as described elsewhere herein.

Figure 13:
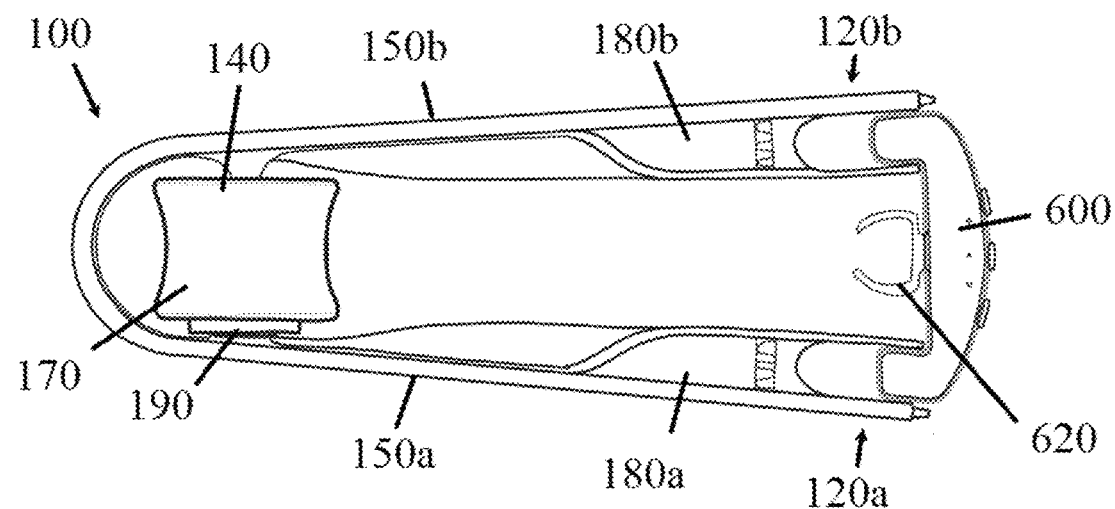
FIG. 13 shows a top view of the bicycle drive assembly of FIG. 1 mated with the controller of FIG. 12.

FIG. 13 shows a top view of the bicycle drive assembly 100 of FIG. 1 mated with the remote control 600 of FIG. 12. The mating of the assembly 100 with the remote 600 may be for storage of the device, or for easy transport when not installed on a bicycle. Once a user arrives at his destination, the device 100 can be detached from the front fork by releasing the clamping jaw. The remote 600 can then be fixed to the elongated arms 150a, b, to make the device less cumbersome and all in one. The device 100 can then be connected to the power supply to recharge the battery for further use. When charging the device 100, it may be laid down or positioned standing upright.

Once use is concluded, the device can be detached from the front fork by releasing the clamping jaw 120a, b. The throttle remote control 610 can be attached to the back part of the elongated arms 150a, b, to make the device 100 less cumbersome and all in one. The device 100 can be connected to the power supply to recharge the battery for further use. The mobile app, connected to the electronic controller integrated in the device and other sensors of the phone, allows riders to access and share the data collected during their journey.

Figure 14:
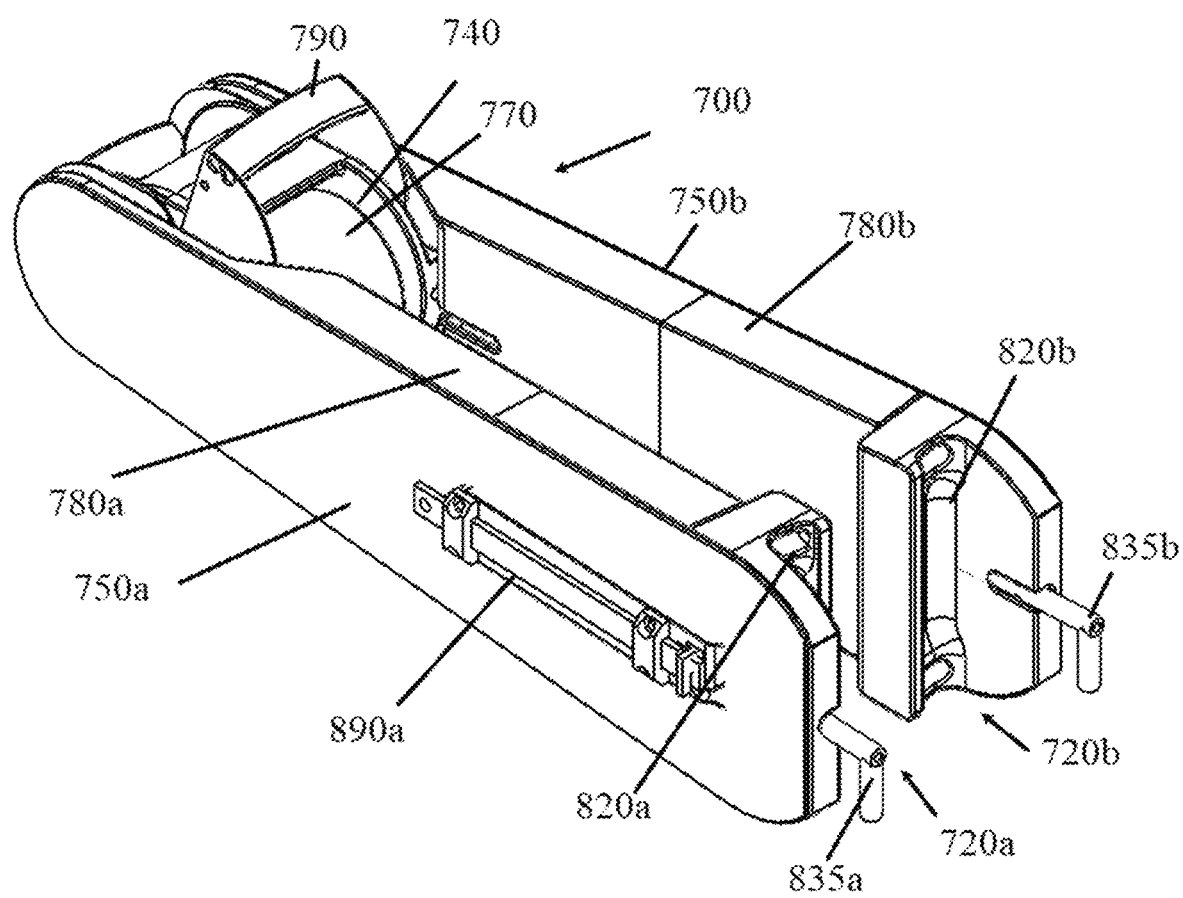
FIG. 14 provides a perspective view of a third embodiment of a bicycle drive assembly in a first configuration.
Figure 15:
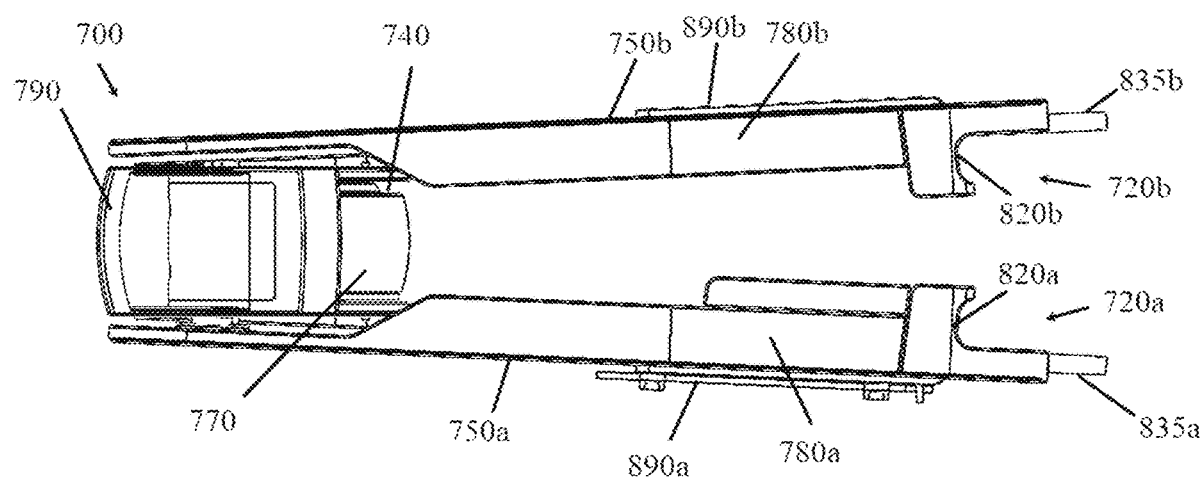
FIG. 15 provides a top view of the bicycle drive assembly of FIG. 14 in the first configuration.
Figure 16:
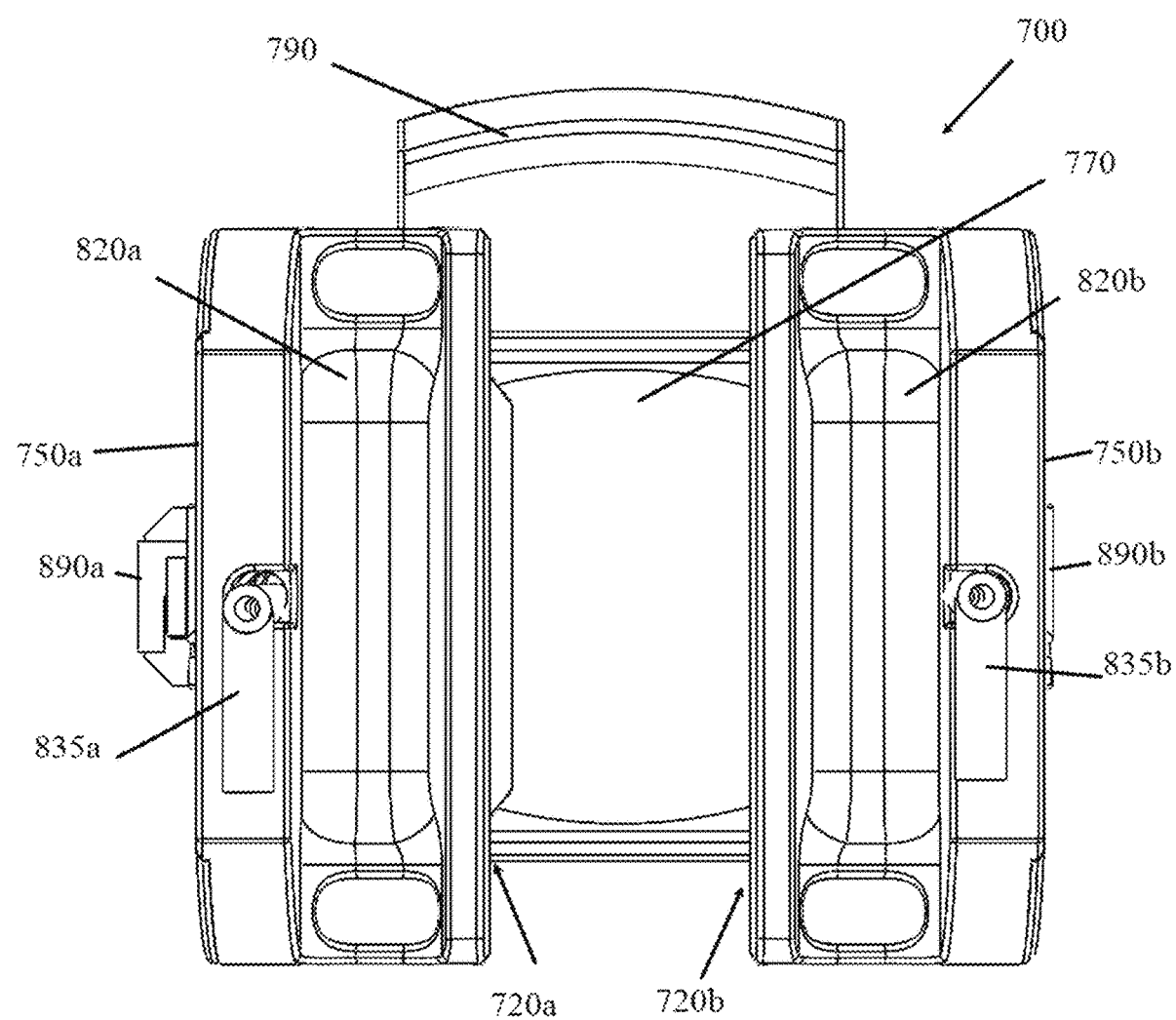
FIG. 16 provides a back view of the bicycle drive assembly of FIG. 14 in the first configuration.

FIG. 14 provides a perspective view of a third embodiment of a bicycle drive assembly 700 in a first configuration. FIG. 15 provides a top view and FIG. 16 provides a back view of the bicycle drive assembly 700 of FIG. 14 in the first configuration.

Figure 17:
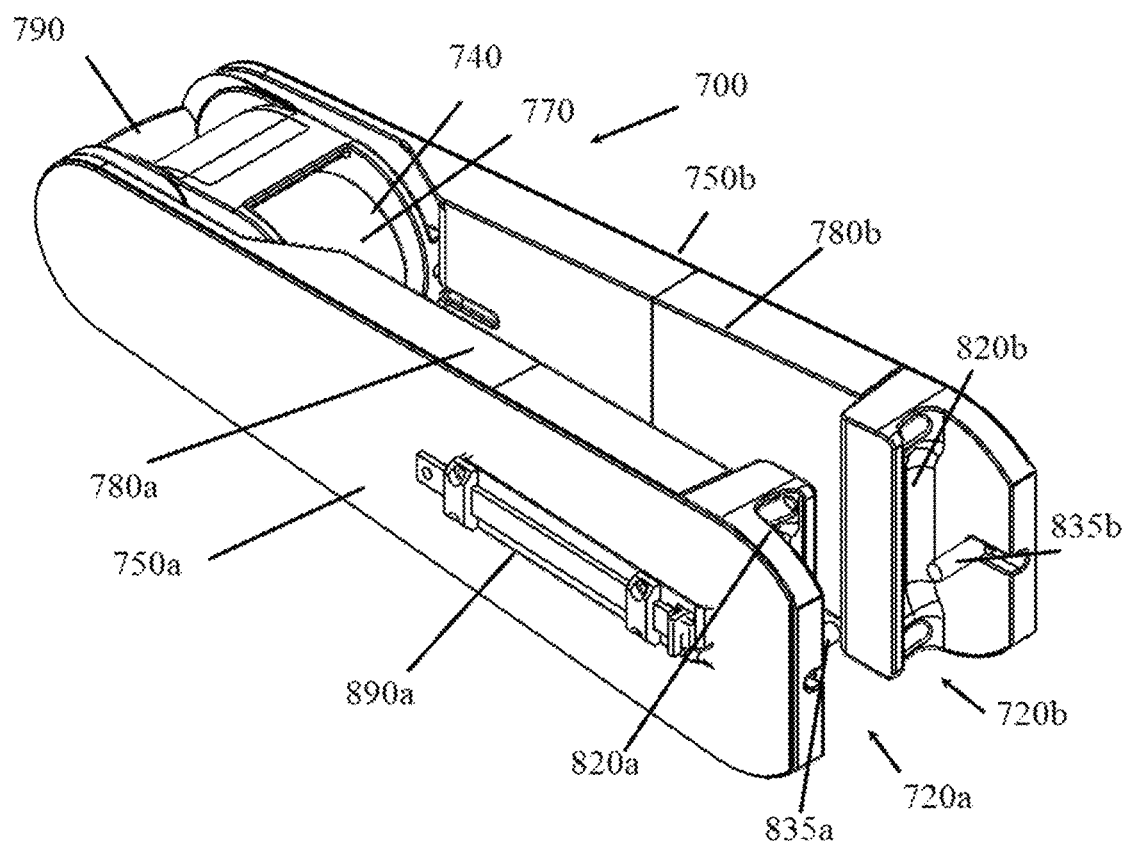
FIG. 17 provides a perspective view of the bicycle drive assembly of FIG. 14 in a second configuration.
Figure 18:
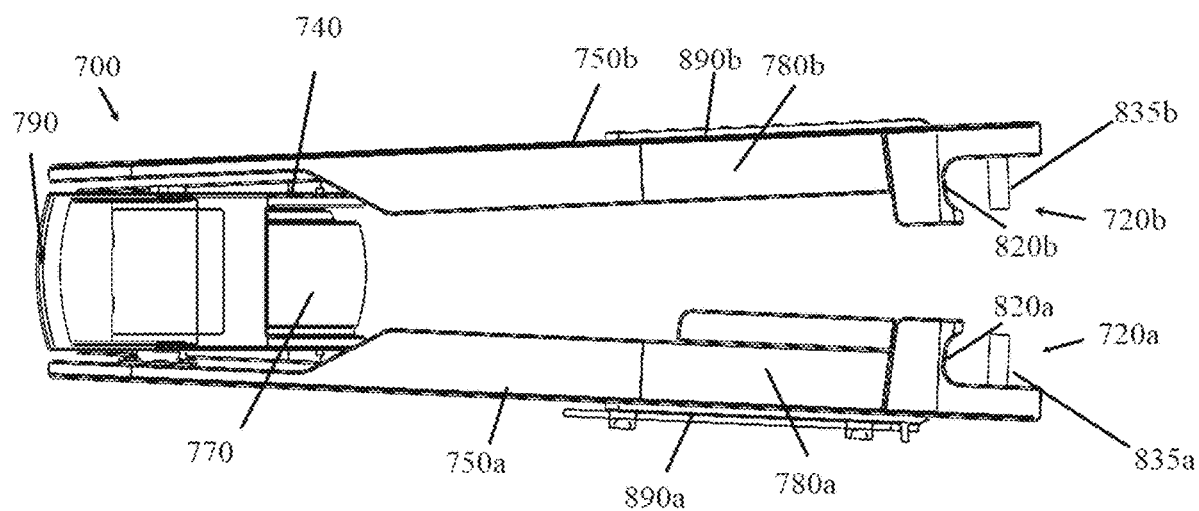
FIG. 18 provides a top view of the bicycle drive assembly of FIG. 14 in the second configuration.
Figure 19:
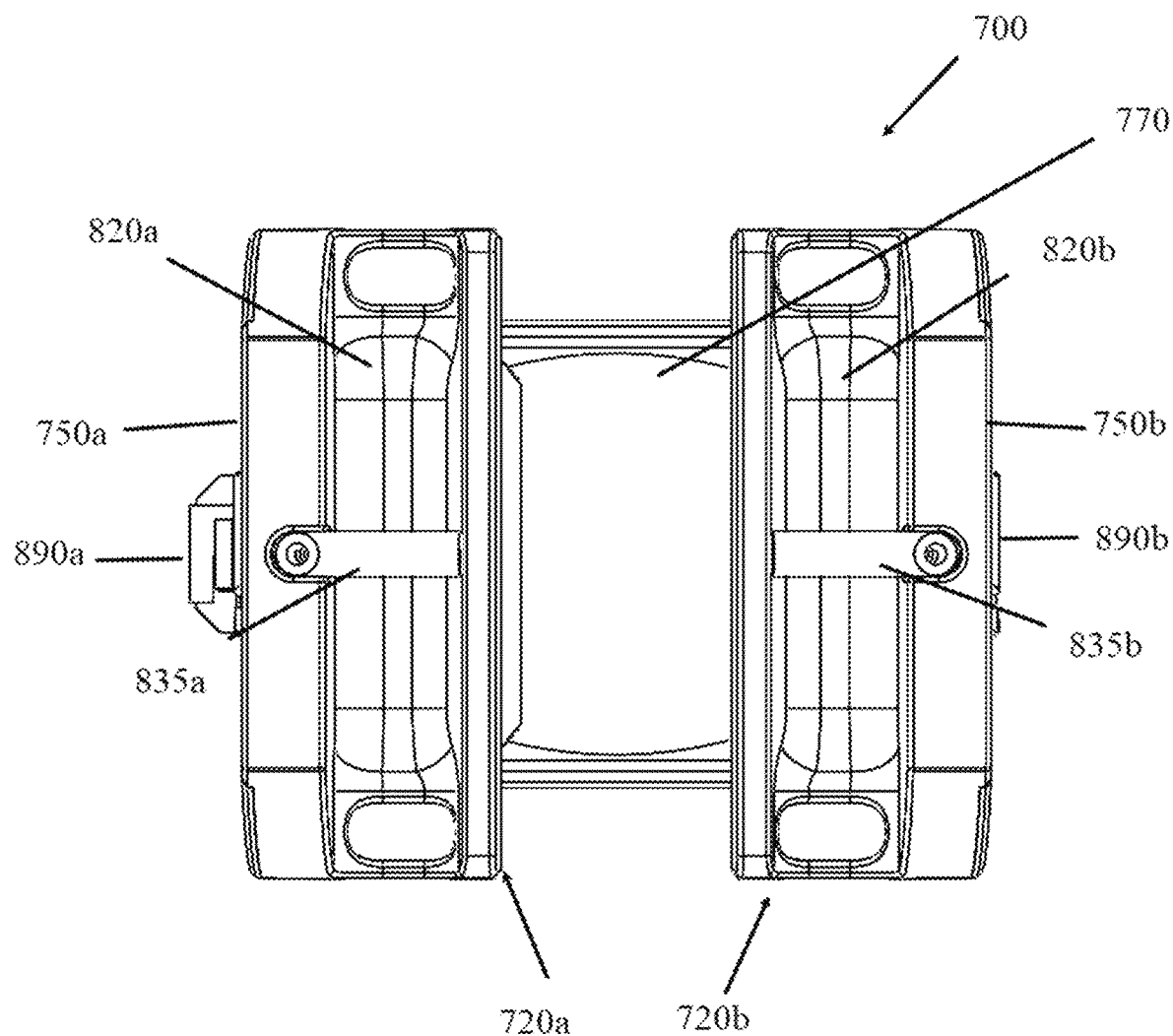
FIG. 19 provides a back view of the bicycle drive assembly of FIG. 14 in the second configuration.

FIG. 17 provides a perspective view of the bicycle drive assembly 700 of FIG. 14 in a second configuration. FIG. 18 provides a top view and FIG. 19 provides a back view of the bicycle drive 700 assembly of FIG. 14 in the second configuration.

Figure 20A:
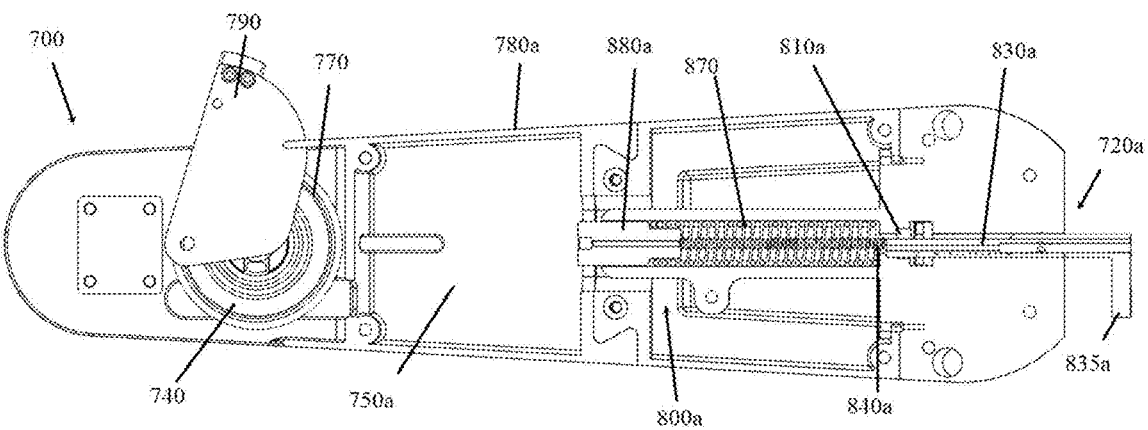
FIG. 20A provides a side view of the bicycle drive assembly of FIG. 14 in the first configuration with a cover of the elongated support removed.
Figure 20B:
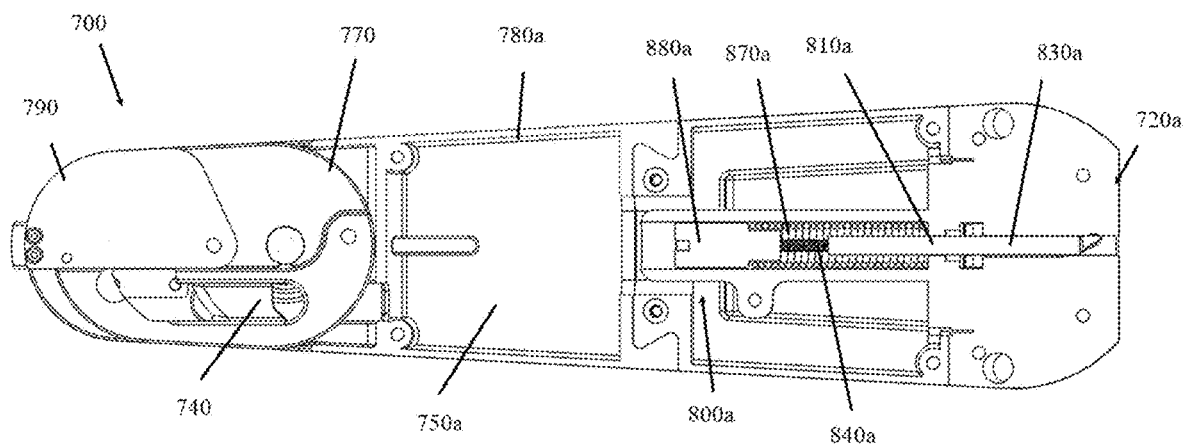
FIG. 20B provides a side view of the bicycle drive assembly of FIG. 14 in the second configuration with the cover of the elongated support removed.

FIGS. 20A-B provide side views of the bicycle drive assembly 700 of FIG. 14 with a cover of an elongate support 750a removed in a first and second configuration respectively.

As shown, the bicycle drive assembly 700 comprises at least one, and typically two, clamps or clamping mechanisms 720a, b for fixing the drive assembly to a bicycle. In the embodiment shown, two clamping mechanisms 720a, b are provided for clamping the drive assembly 700 to two legs of the front fork of the bicycle.

The bicycle drive assembly 700 further comprises a drive mechanism 740 for driving the bicycle wheel and a plurality of elongate supports 750a, b extending from the drive mechanism 740 to the clamps 720a, b. When the drive assembly 700 is mounted to the bicycle using the clamps 720a b, a wheel of the bicycle passes at least partially between the elongate supports 750a, b.

Similarly, where two clamps 720a, b are provided for fixing the drive assembly 700 to the bicycle, one clamp is provided to mate with each of the two legs of the front fork of the bicycle on opposite sides of the wheel, as discussed above with respect to the embodiment of FIG. 1.

Typically, each clamp 720a, b corresponds to one of the elongate supports 750a, b, such that each elongate support ends at its respective clamp. The elongate support 750a, b may further provide a mechanism, or a portion of a mechanism, for actuating the corresponding clamp 720a, b. As visible in the sectioned views of FIGS. 20A-B, for example, each elongate support 750a, b may contain a tensioning mechanism 800a for tensioning the corresponding clamp 720a, b. The tensioning mechanism is described in more detail below with respect to FIGS. 20A-B.

As shown, the drive mechanism 740 is a friction drive comprising a roller 770 applied to a radially outer surface of the bicycle wheel. The roller 770 may comprise a wide variety of materials, and in some embodiments, may comprise a rubber or rubberized core and a stone outer layer, as discussed above with respect to the embodiment of FIG. 4. Such a stone outer layer may provide increased friction between the roller and a surface of a tire mounted on the bicycle. Further, as shown, the surface of the roller 770 may be provided with a convex profile, such that when the convex profile of the roller contacts an outer convex surface profile of the wheel of a bicycle, the roller is maintained at a center of the bicycle wheel profile. Accordingly, the roller 770 may have a convex profile shape, such that the curvature of the roller surface and the curvature of the bicycle wheel combine to automatically center the roller of the corresponding drive mechanism.

Further the bicycle wheel is located at least partially between the roller 770 of the drive mechanism 740 and the fixation point of the clamps 720a, b on the fork of the bicycle. Accordingly, the elongate supports 750a, b on either side of the bicycle wheel are sized to generate a force directed towards the clamps 720*a, b*, and thereby provide pressure between the roller 770 and the outer surface of the bicycle wheel. In this way, the drive assembly 700 may apply a force from the roller 770 to the outer surface of the bicycle wheel greater than a weight of the bicycle drive assembly.

The drive mechanism 740 may further include an electronic motor to drive the roller 770. This may be embedded in the roller itself 770 or it may be provided externally to the roller. When supplied with power, the motor activates the rotation of the roller 770 which engages the rotation of the front wheel by friction between the roller surface and a tire surface of the wheel. Different motor speeds can be set to accelerate the rotation of the roller 770 and so accelerate the rotation of the front wheel. When the motor is not activated, the roller 770 spins freely with the tire, with minimum friction in the motor itself. The motor may be equipped with a rotation sensor, such as a Hall Effect sensor, that constantly monitors the speed of the wheel, in order to adjust the speed of the roller 770 as appropriate.

In some embodiments, when the motor is not engaged, it may apply some friction internally so as to function as a generator, thereby providing some power to batteries within the drive assembly 700.

As shown, the elongate supports 750*a, b*, or a portion of the elongate supports, may provide housings 780*a, b* for various components of the drive assembly 700. These components may include, for example, an electronic control system including a controller, and batteries. Further, the elongate supports 750*a, b* may further comprise tensioning mechanisms for actuating the clamps 720*a, b*. In such an embodiment, the drive assembly 700 may further comprise a clamp actuator 790 adjacent the drive mechanism 740 for actuating the clamps 720*a, b* by way of the tensioning mechanisms 800*a, b* in the corresponding elongate supports 750*a, b*.

Accordingly, a clamping mechanism for the bicycle drive mechanism 700 generally comprises the two clamps 720*a, b* discussed above, a tensioning mechanism 800*a, b* corresponding to each clamp, and a clamp actuator 790 for simultaneously tensioning both clamps by way of the tensioning mechanism.

The tensioning mechanism 800*a* of the first clamp 720*a* is shown in FIG. 20A in the first configuration of FIGS. 14-16 and is shown in FIG. 20B in the second configuration of FIGS. 17-19. In both figures a side view of the bicycle drive assembly 700 is provided with a cover of the first elongate support 750*a* removed. A tensioning mechanism of the second clamp 720*b* is substantially identical and symmetric to the tensioning mechanism 800*a* shown.

Each tensioning mechanism 800*a* typically comprises a tensioning conduit 810*a* which provides a path along which tension can be loaded. Each clamp 720*a, b* is then provided with a bracing element 820*a, b* and a gripping segment 835*a, b*, and when the clamps are tensioned along their tensioning conduits 810*a*, the gripping segment of each clamp is drawn towards the corresponding bracing element.

The bracing element 820*a, b* of each clamp 720*a, b* may be provided with a surface contour or a surface profile ideal for gripping a component of a bicycle, such as the parallel posts that make up the legs of a front fork. Accordingly, each bracing element 820*a, b* may have a substantially arcuate or otherwise rounded cross section that may run along parallel axes, such that it can grip the parallel posts, such as those shown in FIGS. 1-3 with respect to the first embodiment of the bicycle drive assembly 100.

In order to locate the clamps 720*a, b* so that they can grip the bicycle fork, the clamps are spaced apart at fixed locations relative to each other. Accordingly, the clamps 720*a, b* may be rigidly located by their respective tensioning conduits 810*a* or the housings 780*a, b* containing the conduits, which may be the elongate supports 750*a* b, or which may be part of the elongate supports. Typically, when the clamps 720*a, b* are spaced apart from each other, sufficient space is provided between the clamps for a bicycle wheel to pass therebetween.

In some embodiments, the space between the clamps 720*a, b* may be adjustable, such that the drive assembly 700 can be applied to bicycles having different fork designs and different size wheels. In some such embodiments, the elongate supports 750*a, b* may be hinged relative to each other such that they can be horizontally adjustable.

The clamp actuator 790 may be a lever that manually tensions two tensioning cables or other tensioning mechanisms 800*a* simultaneously. The functioning of the actuator 790 and the tensioning mechanisms 800*a* is described in reference to FIGS. 20A-B. The mechanism 800*a* of the first elongated support 750*a* is partially illustrated, with the tensioning cables themselves not shown. It is further noted that in the first configuration, with the clamps 720*a, b* shown as they are in FIGS. 14-16 and 20A, the clamp actuator 790 is in a raised position at close to a right angle relative to the elongate supports 750*a, b*. In the second configuration, with the clamps shown as they are in FIGS. 17-19, the clamp actuator 790 is lowered as shown in those figures.

As shown, the tensioning conduits 810*a* house rigid shafts 830*a*. The rigid shafts are typically linked to the clamp actuator 790 by way of a tensioning cable (not shown). The tensioning cable typically draws the rigid shafts towards the actuator 790. The tensioning mechanisms 800*a* further comprise springs 840*a* opposing the tensioning force, and thereby pushing the rigid shafts 830*a* away from the actuator 790 and in the direction of the clamps 720*a, b*. The rigid shafts 830*a* typically further comprise the gripping segments 835*a, b* which extend radially at an end of the shaft adjacent the corresponding clamp 720*a, b*.

FIGS. 20A-B provide side views of the bicycle drive assembly 700 in the first configuration and the second configuration respectively with the cover removed so that the tensioning mechanism 800*a* of the first clamp 720*a* is visible. It is noted that in the embodiment shown in FIGS. 20A-B, two springs 840*a*, 870*a*, are shown, with the spring 840*a* shown forcing the rigid shafts 830*a* away from the actuator 790 in opposition to the tensioning force being a smaller diameter spring nested within a second, larger spring 870*a*. The second larger spring is discussed below in more detail as a constant force spring 870*a*, and it takes up excess tensioning force provided by the actuator 790.

The structure of the rigid shafts 830*a* in the context of the tensioning mechanism 800*a* is similar to that discussed above in reference to the embodiment of FIGS. 4-11. As discussed and shown in more detail with respect to the embodiment of FIG. 4, the tensioning conduits 810*a* each comprise a path along which corresponding pins travel. The paths each extend axially along the corresponding tensioning conduit and travel about a circumference of the conduit as it extends axially. Accordingly, when the corresponding pin travels along the path, the corresponding rigid shaft 830*a* rotates axially.

In this way, the clamps 720*a, b* transition from the first, untensioned configuration, shown in FIGS. 14-16 and 20A to the second, tensioned configuration shown in FIGS. 17-19 and 20B. In the first configuration, no force is provided by the actuator 790, and therefore no tensioning force opposes the spring force provided by the springs 840*a*. As such, the rigid shafts 830*a* are fully extended, and the pins are at the first ends of their respective paths.

Further, in the first configuration, the gripping segments 835*a, b* of the clamp are rotated with the corresponding rigid shafts 830*a, b* so that they do not interfere with the corresponding bracing elements 820*a, b*. As shown, the gripping segments 835*a, b* may extend from the corresponding rigid shafts 830*a, b* in a direction parallel the axis of the bracing segment 820*a, b*, such that the clamps can be applied directly to corresponding parallel posts, such as the legs of a bicycle fork.

In transitioning from the first configuration to the second configuration, the actuator 790 is used to apply a tensioning force to the tensioning mechanisms 800*a* in opposition to the spring force from the springs 840*a*. Accordingly, the rigid shafts 830*a* move along the corresponding tensioning conduits 810*a* and the pins move along the corresponding paths. As such, the rigid shafts 830*a* move towards the actuator 790 and rotate, such that the gripping segments 835*a, b* extend radially from the rigid shafts 830*a, b* across the corresponding bracing segments 820*a, b* and apply the tensioning force as a clamping force to any object braced against the bracing segments.

Accordingly, upon application of force from the actuator 790, the clamping mechanisms 720*a, b* transitions from the first configuration shown in FIGS. 14-16 in which the rigid shaft 830*a* is untensioned and the gripping segments 835*a, b* do not interfere with the bracing elements 820*a, b* to a second configuration, shown in FIGS. 17-19. In the second configuration, the rigid shafts 830*a* are tensioned and drawn towards the actuator 790 and are thereby rotated, such that the gripping segments 835*a, b* extend across the bracing elements 820*a, b* and apply a clamping force.

Further, in the embodiment shown in FIGS. 14-20B, the bicycle drive assembly 700 can be fixed to a wide variety of bicycles, as the clamping mechanisms 720*a, b* automatically adjust to bicycle forks having various thicknesses. In order for the actuator to securely lock the clamps 720*a, b* to corresponding bicycle forks, the actuator 790 must typically be transitioned to its own locking position. This is the position shown in FIGS. 17-19 in which the actuator extends horizontally in the direction of the elongated supports 750*a, b*. Generally, application of tensioning force from the actuator 790 directly to a tensioning cable and thereby transmitting it to the shaft 830*a* would draw the shaft towards the actuator in opposition to the force of the spring 840*a*. If the thickness of the bicycle fork to which the assembly 700 is applied is known, then the tensioning conduits 810*a* may be calibrated such that the actuator 790 approaches its locking position as the clamps 720*a, b* clamp onto the bicycle fork.

However, in order to accommodate clamping to various thickness bicycle forks, the actual clamping force applied by each of the clamping mechanisms 720*a, b* must reach a maximum locking force and after that level of force is reached, any additional force applied by the actuator 790 must be redirected. Similarly, any additional movement of the actuator 790 after the clamps 720*a, b* are locked must be taken up as slack in the tensioning system. Accordingly, the locking force is regulated by the constant force spring 870*a*. It will be understood that the constant force spring 870*a* is discussed as applying a constant force in contrast with the more traditional spring force applied by the smaller spring 840*a* discussed above. However, a traditional spring may be used as well, so long as the spring can be used to consistently absorb excess force in the way discussed herein. As such, the spring should provide a substantially consistent force over the travel expected during normal usage of the bicycle drive assembly 700 discussed herein.

As shown, each tensioning mechanism 800*a* is provided with a carriage support 880*a*. This carriage support 880*a* is supported by a carriage bracket 890*a, b* accessible at an outside surface of the elongated support 750*a, b*. When applying force by way of the actuator 790, force at each tensioning mechanism 700*a* is first applied to the gripping segment 835*a, b* to draw the gripping segment towards the corresponding bracing element 820*a, b*. When the bicycle drive assembly 700 is located on a bicycle such that each clamp 720*a, b* clamps onto a corresponding bicycle fork, as shown in FIGS. 1-3, when force is applied by way of the actuator 790, the gripping segment 835*a, b* travels towards the bracing element 820*a, b* until it contacts the leg of the bicycle fork in the clamp 720*a*.

After contacting the bicycle fork, the gripping segment 835*a*, no longer moves towards the corresponding bracing segment 820*a, b*. Instead, the carriage support 880*a*, carrying the constant force spring 870*a* begins to move towards the clamp 720*a, b*, thereby compressing the spring 870*a*.

Accordingly, when the actuator 790 is moved from the first, unlocked, position to the second, locked, position, the rotation of the actuator tensions the cables of the tensioning mechanism 800*a*. The force generated by the movement of the actuator 790 is then first applied to the gripping segment 835*a, b* for a first portion of the travel of the actuator. During the first portion of the travel of the actuator 790, the force applied by way of the tensioning mechanism 800*a, b* moves the gripping segment 835*a, b* towards the corresponding bracing segment 820*a, b*. After the gripping segment 835*a, b* contacts the leg of the fork of the bicycle, the gripping segment 835*a, b* stops moving relative to the bracing segment 820*a, b* and the force generated by the movement of the actuator 790 is applied to the carriage support 880*a* instead. During a second portion of the travel of the actuator 790, the force applied by way of the tensioning mechanism 800*a* moves the carriage support 880*a* against the force of the constant force spring 870*a* while the clamps 720*a, b* remain stationary. Accordingly, the maximum clamping force applied at the gripping segments 835*a, b* corresponds to the spring force of the constant force spring 870*a*.

As discussed above, in many embodiments, the gripping segment 835*a, b* rotates from a first orientation in the first configuration to a second orientation in the second configuration during application of force by way of the actuator 790. In such embodiments, the rotation of the corresponding shaft 830*a, b* is during the first portion of the travel of the actuator 790. After the gripping segment 835*a, b* is rotated into position, the gripping segment is drawn towards the object being clamped between the gripping segment and the bracing segment 820*a, b*, typically the fork of the bicycle. After clamping onto the fork, any additional force from the actuator 790 is redirected to the carriage 880*a*, which is then moved against the corresponding constant force spring 870*a*.

Figure 21A:
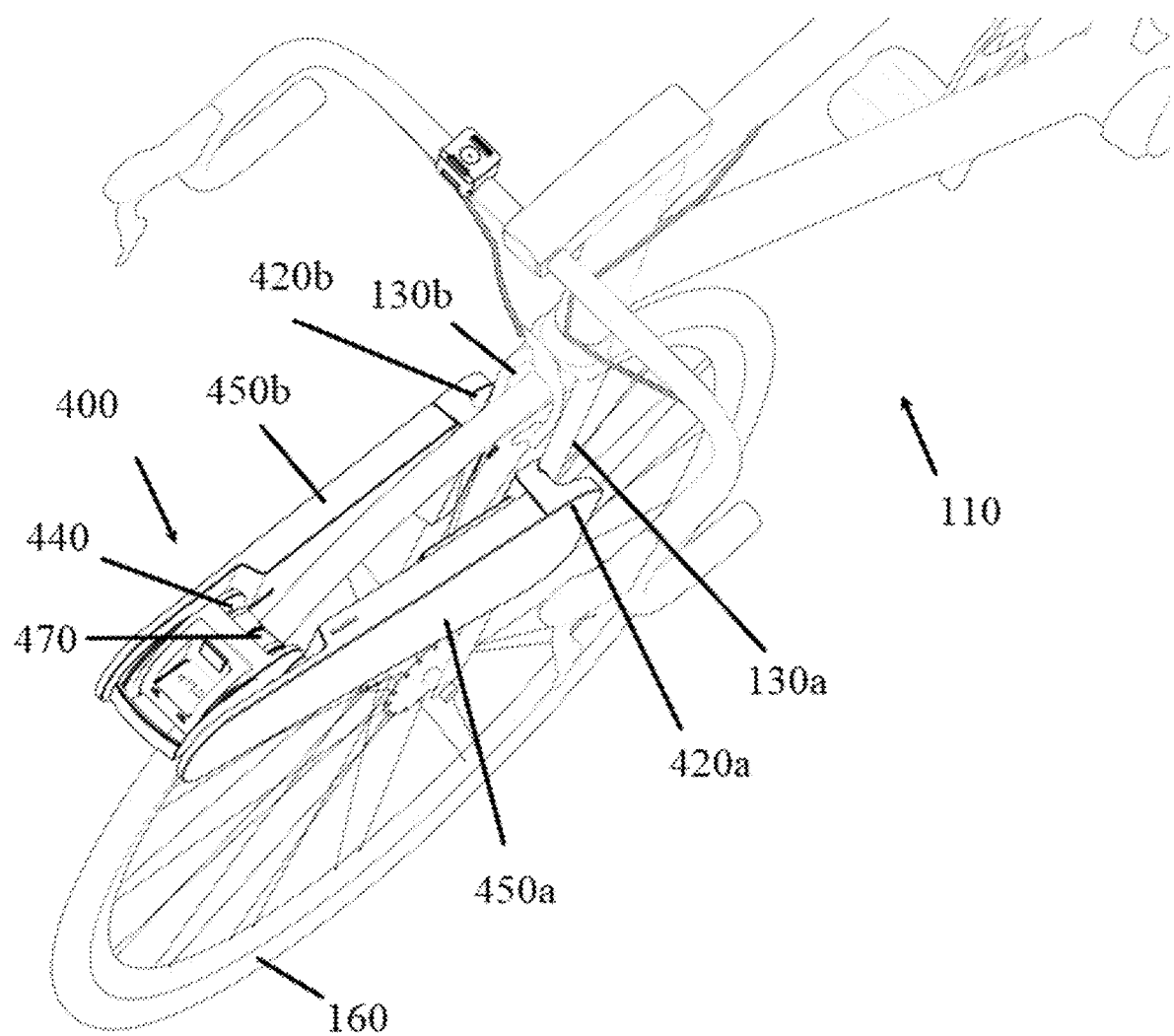
FIGS. 21A-B show top perspective views of the bicycle drive assembly of FIG. 4 mounted on a bicycle.
Figure 21B:
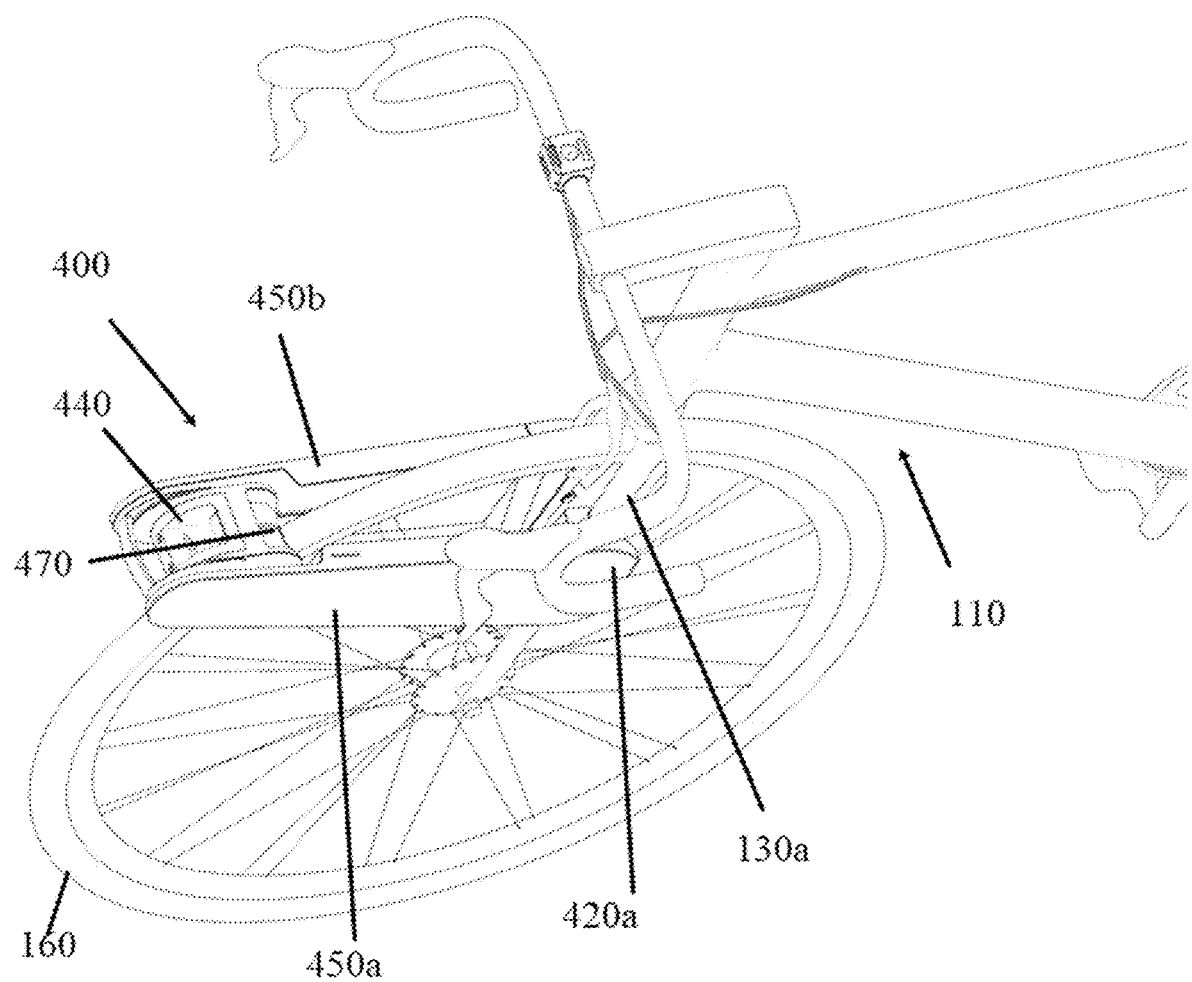
Figure 21C:
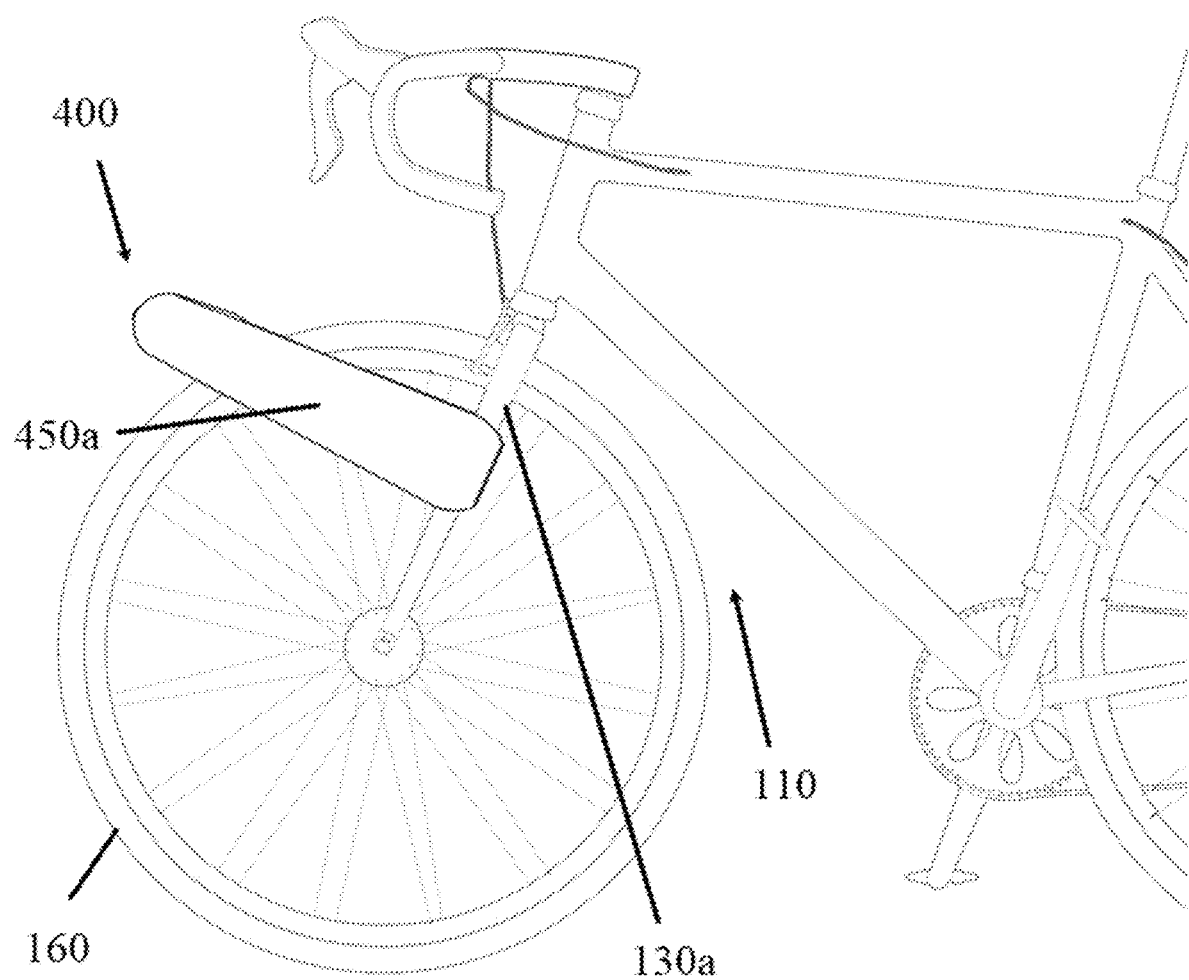
FIG. 21C shows a side view of the bicycle drive assembly of FIG. 4 mounted on a bicycle.

FIGS. 21A-B show top perspective views of the bicycle drive assembly 400 of FIG. 4 mounted on a bicycle 110. FIG. 21C shows a side view of the bicycle drive assembly 400 of FIG. 4 mounted on a bicycle 110.

As shown, the bicycle drive assembly 400 comprises two clamps 420*a, b* for fixing the drive assembly to the bicycle 110. As shown, each clamp 430*a, b* can be fixed to a corresponding leg 130*a, b* of the front fork of the bicycle.

The bicycle drive assembly 400 further provides a drive mechanism 440 for driving a bicycle wheel 160 and a pair of elongate supports 450a, b extending from the drive mechanism 440 to the clamps 420a, b. As shown, the bicycle wheel 160 passes at least partially between the elongate supports 450a, b.

Typically, each clamp 420a, b corresponds to one of the elongate supports 450a, b, such that each elongate support ends at its respective clamp. The elongate support 450a, b may further provide a mechanism, or a portion of a mechanism, for actuating the corresponding clamp 420a, b.

As shown, the drive mechanism 440 is a friction drive comprising a roller 470 applied to a radially outer surface of the bicycle wheel 160. The roller 470 may comprise a wide variety of materials, and in some embodiments, may comprise a rubber or rubberized core and a stone outer layer. In some embodiments, the roller 470 may be interchangeable such that a user may select an appropriate roller for weather or surface conditions. Further, as in the embodiment shown, the bicycle wheel 160 is located at least partially between the roller 470 of the drive mechanism 440 and the fixation point of the clamps 420a, b on the legs 130a, b of the fork of the bicycle. Accordingly, the elongate supports 450a, b on either side of the bicycle wheel 160 are sized to generate a force directed towards the clamps 420a, b, and thereby provide pressure between the roller 470 and the outer surface of the bicycle wheel 160. In this way, the drive assembly 100 may apply a force from the roller 470 to the outer surface of the bicycle wheel 160 greater than a weight of the bicycle drive assembly.

While the various embodiments of the bicycle drive assembly 100, 400, 700 are shown incorporating a variety of features, additional features and functionalities may be added as well. For example, embodiments may incorporate headlights, turn indicators, and embedded cameras. These features may be incorporated into the drive assembly 100, 400, 700 itself, or some components may be embedded in a remote 600.

While the bicycle drive assembly 100, 400, 700 is shown mounted on to a front wheel 160 of a bicycle 110, it will be understood that in some embodiments, the assembly can be mounted to a back wheel as well.

Figure 22:
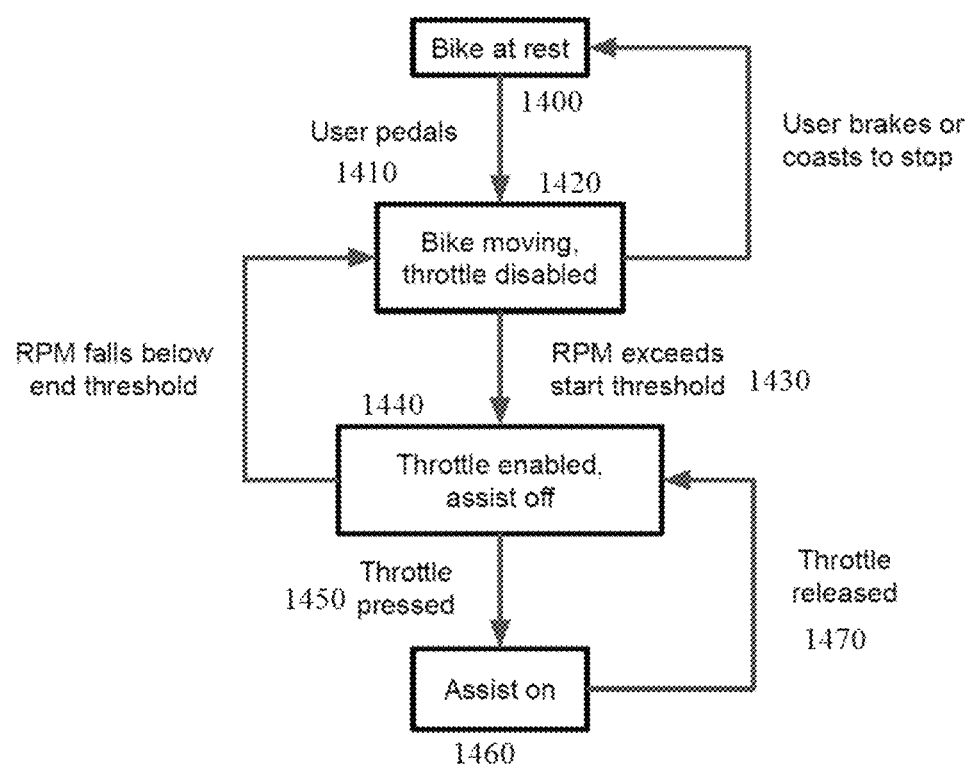
FIG. 22 shows a flowchart illustrating a method for driving a wheel of a bicycle in accordance with this disclosure.

FIG. 22 shows a flowchart illustrating a method for driving a wheel of a bicycle in accordance with this disclosure.

As shown, the method generally comprises first providing a drive motor 190 driving a friction roller 170, 470, 770 and then monitoring the speed of a driven wheel 160 of a bicycle 110. The monitoring of the speed may be by monitoring the speed of the motor itself using an RPM sensor, such as a Hall Effect sensor, for example.

Accordingly, as shown, the bike is initially at rest (at 1400) Once a user begins pedaling (at 1410), the method determines that the bike is moving, but the throttle remains disabled (at 1420) so long as the motor speed or the detected wheel speed remains below a threshold level.

Once the motor or wheel speed crosses the throttle enabling threshold level (at 1430), the throttle is enabled (at 1440), but the assist function of the bicycle drive assembly 100 remains inactive.

Once a throttle is activated (at 1450) by a user, such as by way of a remote control 600 discussed above, the assist function of the drive motor 190 is turned on (at 1460). Accordingly, assist is typically active only if the motor speed is above a threshold level and the throttle is activated.

If the throttle is released by the user (at 1470), the throttle remains enabled so long as the motor speed is above the throttle enabling threshold, but the assist functionality is turned off (at 1440). Similarly, if the motor speed falls below the throttle assist threshold (at 1480), the throttle is disabled (at 1420) and the user may apply brakes or coast to a stop without affecting the drive assembly.

In use, the motor may be applied in a variety of ways. Because the motor speed is known by way of the RPM sensor discussed above, when the motor is actuated, it may be actuated at a speed relative to the current motor speed such that the wheel is driven relative to the current wheel speed, thereby operating more efficiently. For example, if the motor speed is known, the application of force may be at a speed some percentage higher than the current speed in order to apply a constant predictable acceleration at any speed. Similarly, in some embodiments, the motor may be applied at the current speed, such that the current speed is maintained. A variety of potential options and algorithms may be selectable by way of a smartphone application.

Accordingly, the electronic controller system may be composed of an electronic controller mounted on the arm of the device, connected to Rotation Per Minute sensors, integrated in the motor. The electronic controller can then be provided with a unique algorithm that constantly monitors the hall sensors inside the motor for changes in rpm (revolutions per minute) and adjusts the amount of current delivered to the motor based on the speed of the bicycle at the time. This optimizes battery life and solves a common problem of slipping roller on friction drive transmissions. The electronic controller also provides data via bluetooth, to a mobile app.

As such, in some embodiments, the drive assembly may be linked to a user application, such as on a smartphone. The application may then enable users to map bike-lane hazards and alert other bikers in the vicinity. It may also allow for alerting car-drivers of nearby bicyclists.

In some embodiments, the mobile application receives data via bluetooth, from the electronic controller of the device and other sensors of the phone. The mobile application may feature basic options such as the visualization of rider's performance (speed, miles, calories, Co2 footprint etc.) and motor information (speed, battery level, power output, etc.) and advanced options such as:

Hazard mapping: A rider can add location pins on the map by pushing a hazard button on the remote, attached on the bike's handlebar, while the phone is in rider's pocket.

When the rider approaches a pin dropped by someone else—the app will alert the device to signal the rider.

Virtual bell mounted: A rider will press the button on handlebar device and will be able to relay her real-time location to other navigation or mapping applications.

In some embodiments, A Li-ion battery capable of powering the electric motor is wired to the motor pack via the electronic controller system. When activated, and on demand of the electronic controller only, the battery powers the electric motor. The battery can be recharged from a common AC power supply. Battery, motor and electronic controller unit are mounted close together on a single support, only a short connector is required to connect them together. While a Li-ion battery is mentioned, other battery chemistries are contemplated as well.

In some embodiments, the electronic control unit is capable of managing the delivery of power generated from the battery to the electric motor. The electronic controller is set by software to operate only on pulse signal, transmitting to the electric motor fast changes in the amplitude of supply generated by the battery. After an increase of supply, the controller immediately stops transmitting power to the electric motor.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A bicycle drive assembly comprising:
    at least one clamp for fixing to a bicycle;
    a drive mechanism for driving a bicycle wheel; and
    a plurality of elongate supports extending from the drive mechanism to the at least one clamp,
    wherein when applied to a bicycle, a wheel of the bicycle passes partially between the elongate supports, and
    wherein the at least one clamp comprises:
        a plurality of clamps;
        a tensioning conduit corresponding to each of the plurality of clamps, each tensioning conduit incorporated into a corresponding one of the plurality of elongate supports; and
        an actuator for simultaneously tensioning the plurality of clamps by way of the tensioning conduits,
        wherein each clamp of the plurality of clamps has a bracing element and a gripping segment, and wherein when the clamps are tensioned along the tensioning conduits, the gripping segment of each clamp is drawn towards the corresponding bracing element.

2. The clamping mechanism of claim 1 wherein the bracing element of each clamp has a substantially arcuate cross section along parallel planes and is configured to grip substantially parallel posts.

3. The clamping mechanism of claim 1 wherein the clamps are spaced apart at fixed locations relative to each other, and wherein the clamps are rigidly located by their respective tensioning conduits or housings for the respective tensioning conduits.

4. The clamping mechanism of claim 3, wherein a space between the clamps is sufficient for the wheel of the bicycle to pass therebetween.

5. The clamping mechanism of claim 1 wherein the actuator is a lever that manually tensions two tensioning cables within corresponding tensioning conduits simultaneously.

6. The clamping mechanism of claim 1 wherein each tensioning conduit houses a rigid shaft, and wherein the rigid shaft has a pin extending radially therefrom, and wherein the tensioning conduit comprises a path that travels about a circumference of the conduit as it extends axially, such that when the pin travels along the path, the shaft rotates axially.

7. The clamping mechanism of claim 6 further comprising a spring opposing tensioning force within each tensioning conduit, such that when tensioning force is applied by the actuator, the rigid shaft is drawn in a first axial direction and rotates from an untensioned position and orientation to a tensioned position and orientation, and wherein when the tensioning force is released, the spring returns the shaft to the untensioned position and orientation.

8. The clamping mechanism of claim 6, wherein the rigid shaft ends in the gripping segment, and wherein the gripping segment extends radially from the shaft, such that in the tensioned orientation the gripping segment passes across the bracing element, and such that in the untensioned orientation, the gripping segment does not interfere with the bracing element when the bracing elements are applied to supports.

9. The clamping mechanism of claim 6, wherein each tensioning conduit further comprises a constant force spring mounted on a carriage, and wherein the path in each tensioning conduit has a first segment that travels about the circumference of the conduit and a second segment that is linear, and wherein after the pin reaches the linear segment of the path, additional force from the actuator may be applied to the carriage against the resistance of the constant force spring.

10. The clamping mechanism of claim 9, wherein upon tensioning the clamps along the tensioning conduit, the gripping segment of each clamp is rotated by the corresponding path in a first segment of travel and is then drawn towards the corresponding bracing element during a second segment of travel, and wherein, after clamping onto an object to be clamped, any additional force from the actuator is applied to the carriage.

11. The clamping mechanism of claim 1, wherein each tensioning conduit comprises a constant force spring, and wherein when the gripping segment of each clamp is drawn towards the corresponding bracing element, a final segment of tensioning for the gripping segment is against the force of the constant force spring.

12. The clamping mechanism of claim 11, wherein for each tensioning conduit, the constant force spring is mounted on a carriage, and wherein during a first segment of travel, the gripping segment moves towards the bracing element, and during the final segment of travel, the gripping segment is stationary relative to the bracing element and the carriage moves relative to the gripping segment.

13. A bicycle drive assembly comprising:
    at least one clamp for fixing to a bicycle;
    a drive mechanism for driving a bicycle wheel; and
    a plurality of elongate supports extending from the drive mechanism to the at least one clamp,
    wherein when applied to a bicycle, a wheel of the bicycle passes partially between the elongate supports, such that the elongate supports are separated by the wheel of the bicycle,
    and wherein when applied to a bicycle, the at least one clamp clamps at least one leg of a bicycle fork, and wherein the plurality of elongate supports extend substantially perpendicularly from the at least one leg.

14. The bicycle drive assembly of claim 13, wherein the at least one clamp is a plurality of clamps for independently engaging legs of a bicycle fork on opposite sides of the wheel of the bicycle.

15. The bicycle drive assembly of claim 14, wherein each clamp corresponds to one of the plurality of elongate supports, and wherein the elongate supports each contain a tensioning mechanism for tensioning the corresponding clamp.

16. The bicycle drive assembly of claim 15 further comprising a clamp actuator adjacent the drive mechanism for actuating the plurality of clamps by way of the tensioning mechanisms in the corresponding elongate supports.

17. The bicycle drive assembly of claim 13, wherein the drive mechanism is a friction drive.

18. The bicycle drive assembly of claim 17, wherein the friction drive comprises a roller applied to a radially outer surface of the bicycle wheel, and the roller has a stone outer layer.

19. The bicycle drive assembly of claim 17, wherein the friction drive comprises a roller, and wherein the roller surface has a convex profile for maintaining an outer surface of the bicycle wheel at a center of the profile during use.

20. The bicycle drive assembly of claim 17, wherein the friction drive comprises a roller applied to a radially outer surface of the bicycle wheel, and the at least one clamp is rigidly fixed to the bicycle, such that the plurality of elongate supports generate a force directed towards the clamp, thereby providing an application force from the roller to the outer surface of the bicycle wheel greater than a weight of the bicycle drive assembly.

21. The bicycle drive assembly of claim 13, wherein the plurality of elongate supports comprise housings, and wherein batteries and electronic control systems are contained within the housings.

22. The bicycle drive assembly of claim 13 further comprising a motor in the drive assembly and an electronic controller for controlling the motor, and wherein the motor includes a Hall Effect sensor for determining a speed of the motor.

23. The bicycle drive assembly of claim 13, wherein the at least one clamp comprises:
   a plurality of clamps configured to selectively clamp a bicycle fork of the bicycle;
   a tensioning conduit corresponding to each of the plurality of clamps, each tensioning conduit incorporated into a corresponding one of the plurality of elongate supports; and
   an actuator for simultaneously tensioning the plurality of clamps by way of the tensioning conduits,
   wherein each clamp has a bracing element and a gripping segment, and wherein when the clamps are tensioned along the tensioning conduits, the gripping segment of each clamp is drawn towards the corresponding bracing element to clamp the bicycle fork.

24. The bicycle drive assembly of claim 13,
   wherein the at least one clamp is a plurality of clamps configured to engage the bicycle fork of the bicycle on opposite sides of the wheel of the bicycle, and wherein the drive assembly further comprises an actuator configured to simultaneously tension the plurality of clamps to releasably clip-on the drive assembly to the bicycle fork such that a friction roller of the drive assembly engages the wheel of the bicycle.

25. A bicycle drive assembly comprising:
   at least one clamp for releasably fixing to a bicycle having a bicycle fork on opposite sides of a wheel of the bicycle, wherein the at least one clamp engages the fork;
   a friction drive for driving the wheel of the bicycle; and
   a plurality of elongate supports extending from the friction drive to the at least one clamp,
   wherein the wheel of the bicycle passes partially between the elongate supports, such that the elongate supports are separated by the wheel of the bicycle, and wherein the at least one clamp is readily removable from the bicycle,
   and wherein when applied to the bicycle, the at least one clamp clamps at least one leg of a bicycle fork of the bicycles, and wherein the plurality of elongate supports extends substantially perpendicularly from the at least one leg.

* * * * *